(12) United States Patent
Venkatesh et al.

(10) Patent No.: US 12,298,841 B1
(45) Date of Patent: May 13, 2025

(54) FAILURE PREDICTION OF FIELD-DEPLOYED MISSION CRITICAL INTEGRATED CIRCUIT CHIPS USING ARTIFICIAL INTELLIGENCE

(71) Applicant: Synopsys, Inc., Mountain View, CA (US)

(72) Inventors: Shekaripuram V. Venkatesh, Los Altos, CA (US); Tonatiuh Rangel Gordillo, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 56 days.

(21) Appl. No.: 18/186,887

(22) Filed: Mar. 20, 2023

Related U.S. Application Data

(60) Provisional application No. 63/321,663, filed on Mar. 19, 2022.

(51) Int. Cl.
*G06F 11/00* (2006.01)
*G06F 11/07* (2006.01)
*G06N 3/091* (2023.01)

(52) U.S. Cl.
CPC ......... *G06F 11/0751* (2013.01); *G06N 3/091* (2023.01)

(58) Field of Classification Search
CPC ............ G06F 11/0751; G06F 11/0754; G06F 11/0793; G06F 11/0766; G06F 11/3058; G06N 3/091
See application file for complete search history.

(56) References Cited

U.S. PATENT DOCUMENTS

| | | | |
|---|---|---|---|
| 2020/0393506 A1* | 12/2020 | Landman | G01R 31/3193 |
| 2021/0042644 A1* | 2/2021 | Blanton | G06F 11/0751 |
| 2022/0222527 A1* | 7/2022 | Khalil | G06F 11/3452 |
| 2022/0229720 A1* | 7/2022 | Kantharaj | G06F 11/3476 |

OTHER PUBLICATIONS

Amini-Sheshdeh, Z. et al. "New HCI and TDDB sensors Based on Transition Time Monitoring," Scientia Iranica, vol. 22, No. 6, Dec. 1, 2015, pp. 2447-2456.
Chen, C.C. et al. "Processor-Level Reliability Simulator for Time-Dependent Gate Dielectric Breakdown," Microprocessors and Microsystems, vol. 39, No. 8, Nov. 1, 2015, pp. 950-960.
Fan, A. et al. "Advanced Circuit Reliability Verification for Robust Design," International Reliability Physics Symposium, Mar. 31, 2019, pp. 1-8.

(Continued)

*Primary Examiner* — Joseph D Manoskey
(74) *Attorney, Agent, or Firm* — Fenwick & West LLP

(57) ABSTRACT

A configuration may identify an IC chip component the IC chip component comprising one of a logic block, a memory block, and a power grid. A configuration may train a machine learning model based on one or more features and one or more labels corresponding to the identified IC chip component. A configuration may generate an artificial intelligence model having characteristics comprising the trained machine learning model, the one or more features, and the one or more labels. A configuration may generate a prediction for the one or more labels based on past, present and projected one or more features. A configuration may monitor future label prediction versus a failure threshold. A configuration may generate a notification in response to the failure threshold being reached.

21 Claims, 18 Drawing Sheets

(56) References Cited

OTHER PUBLICATIONS

He, K. et al. "EM-Based On-Chip Aging Sensor for Detection and Prevention of Counterfeit and Recycled ICs," IEEE/ACM International Conference on Computer-Aided Design, Nov. 2, 2015, pp. 146-151.

Jin, W. et al. "EMGraph: Fast Learning-Based Electromigration Analysis for Multi-Segment Interconnect Using Graph Convolution Networks," 58th ACM/IEEE Design Automation Conference, Dec. 5, 2021, pp. 919-924.

Sengupta, D. et al. "Estimating Circuit Aging due to BTI and HCI Using Ring-Oscillator-Based Sensors," IEEE Transactions on Computer-Aided Design of Integrated Circuits and Systems, vol. 36, No. 10, Jan. 5, 2017, pp. 1688-1701.

Wang, T. "On-chip Current Measurement for Multi-Site Electromigration Monitoring," Master's thesis, Iowa State University, Iowa, 2011.

\* cited by examiner

FAILURE PREDICTION OF FIELD-DEPLOYED MISSION CRITICAL INTEGRATED CIRCUIT CHIPS USING ARTIFICIAL INTELLIGENCE

RELATED APPLICATIONS

This application claims a benefit of, and priority to, U.S. Patent Application No. 63/321,663, filed Mar. 19, 2022, the contents of which are incorporated by reference it its entirety.

TECHNICAL FIELD

The present disclosure relates to integrated circuit chips, and more specifically, failure detection within integrated circuit chips.

BACKGROUND

Mission-critical integrated circuit chips (MQKs) are necessary for the functioning of a specific electronic device. MQKs are deployed in industries such as defense, space, and medical. Failure of MQKs impact processes and operations and likely to have prohibitive costs.

The causes of MQK failures include aspects of the device structures themselves including, for example, Bias Temperature Instability, Hot Carrier Injection, Time Dependent Dielectric Breakdown, Electromigration, and Thermal Stress. It is, however, difficult to detect failure due to these aspects due to the indirect effects they have on the performance of the electronics circuits within MQKs. Hence, failure often is not detected until after the adverse impact of such failure have taken effect.

SUMMARY

Disclosed is a configuration to predict failure of an integrated circuit (IC) chip. The IC chip includes IC chip components that may be presented in a logical (or conceptual framework). Failure of any of the IC chip components constitutes failure of the entire chip. The IC chip components are comprised of circuit elements such as transistors and interconnects. Circuit elements can be combined to create basic circuits such as NOR gates, NAND gates, and memory cells. Basic circuits can be combined to create sub-circuits. Any of the circuit elements, basic circuits and sub-circuits can be referred to as circuit structures. The IC chip component may be a logic block, a memory block, or a power grid. The configuration receives data from one or more monitors in a chip component. The configuration examines the IC chip component for failure analysis. Data from the monitors associated with one or more circuit structures of the identified IC chip component may be logged in a database on an ongoing basis. Based on present and historical data, a machine learning model (built a priori or during the course of the chip operation) evaluates and predicts in future certain parameters of the circuit structures referred to as "health-metric". If a health-metric is predicted to cross a failure threshold, an alarm is raised. The configuration may be further structured to request (or trigger) a remedial action. The remedial action may be tailored based on an impact of a potential failure.

By way of example, the techniques described herein relate to a configuration for predicting failure of an integrated circuit (IC) chip, the method including: identifying an IC chip component, the IC chip component including one of a logic block, a memory block, and a power grid; training a machine learning model based on one or more features and one or more labels corresponding to the identified IC chip component; generating a trained artificial intelligence/machine learning model; using one or more features, and the one or more past labels and the trained machine learning model; generating a prediction for the one or more future labels based on past, present and projected one or more features; monitoring future label prediction versus a failure threshold; and generating a notification in response to the failure threshold being reached. The configuration may include triggering a remedial action in response to the failure threshold behind reached.

By way of example, the identified IC component may be a logic block, the machine learning model includes a multi-layer perceptron (MLP), the one or more features includes circuit transistor and interconnect parameters, and the one or more features labels includes a path delay based on a specific sub-critical path. Also, by way of example, the IC component may be the logic block, the machine learning model includes a graph neural network (GNN), the one more features includes one or more GNN nodes annotated with transistor parameters and one or more GNN edges annotated with interconnect parameters, and the one or more labels includes a path delay based on a sub-critical path and a critical path. Further way of example, the IC component may be the logic block, the machine learning model includes multi-layer perceptron (MLP), the one more features includes circuit transistor parameters, and the one or more labels includes a gate delay of a sub-critical path or a critical path.

BRIEF DESCRIPTION OF THE DRAWINGS

The disclosure will be understood more fully from the detailed description given below and from the accompanying figures of embodiments of the disclosure. The figures (singular FIG. or plural FIGS. or FIGS.) are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to failure prediction of field-deployed mission critical integrated circuit chips using artificial intelligence. Mission critical integrated circuit chips (MQKs) are fundamentally necessary for some specific electronic devices. MQKs may be found in industries such as defense, space, and hospital systems. They also may be found in commercial applications such as robotics and transportation. Detection of possible failures of MQKs in advance allows for maintenance and/or taking prescriptive measures to ensure actual failures are avoided to limit their disruptive impact and ensure subsequent success of their mission. The disclosed configuration provides for a system to monitor MQKs in real-time. Smart telematic systems, equipped with artificial intelligence and machine learning models help mitigate or prevent failure by enabling timely and accurate intervention.

Example System for Chip Failure Prediction

Figure 1:
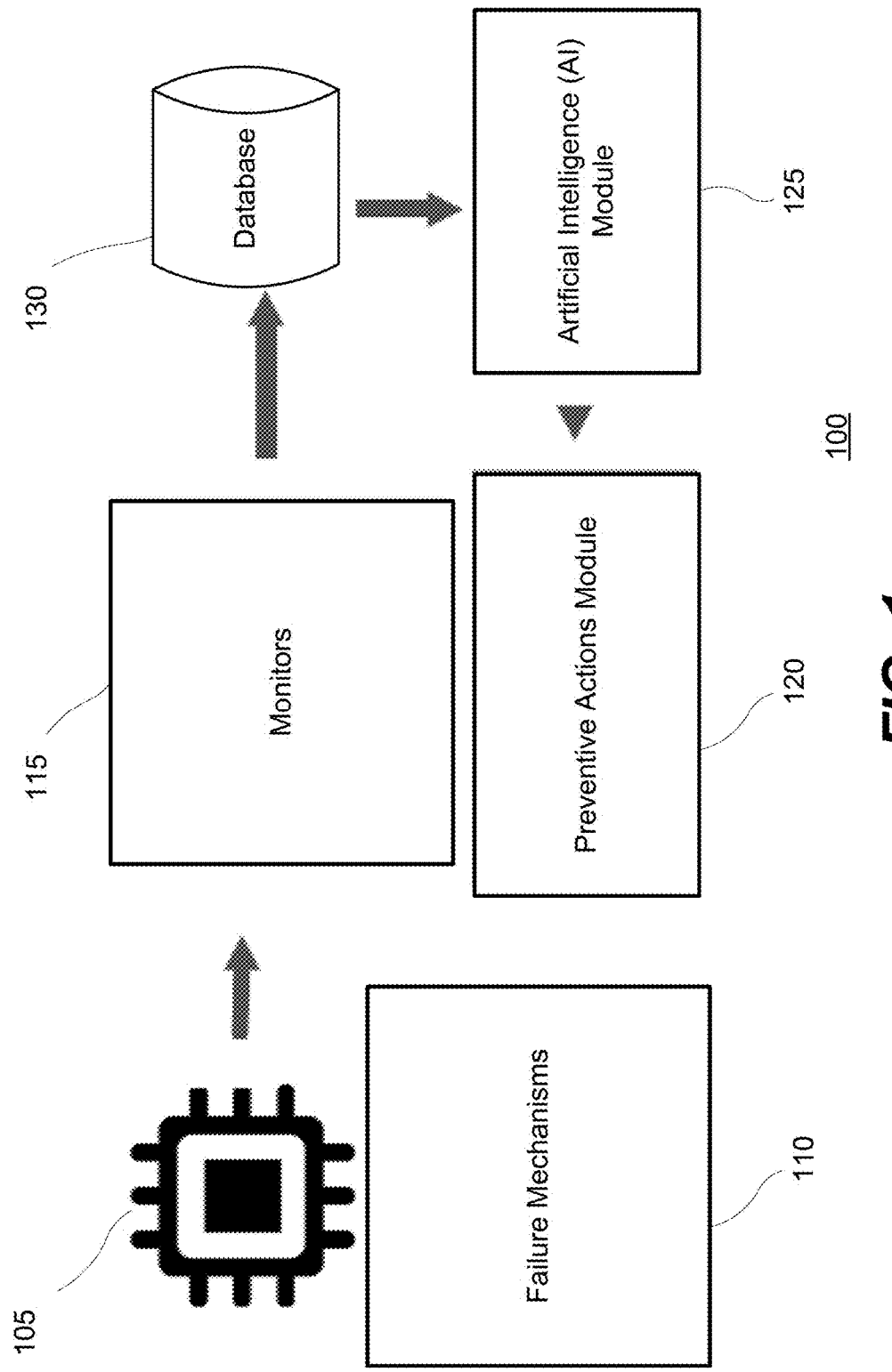
FIG. 1 illustrates an example of a system for real-time monitoring an integrated circuit (IC) chip and taking preventive action prior to potential failure in accordance with one embodiment.

FIG. 1 illustrates an example of a system 100 for real-time monitoring an integrated circuit (IC) chip and taking preventive action prior to potential failure in accordance with one embodiment. In the system 100 there is an integrated circuit (IC) chip ("chip") 105. Within the chip 105, there may be one or more ways that a chip may fail, and these may be referenced as mechanisms, or failure mechanisms 110. As a chip ages, its performance degrades due to the one or more chip failure mechanisms 110.

The chip includes one or more embedded monitors 115, which also may include sensors, to monitor the various variables that are impacted by the failure mechanisms 110. The data from the monitors 115 may include voltage, temperature, delay, and other readings that may be transmitted to a database 130 in real-time (substantially instantaneous). The data may be transmitted at given frequency, e.g., every few seconds, through telematics. The database 130 may be external to the chip 105 and may be part of a cloud computing system that communicates with a system within which the chip 105 is integrated. The database 130 couples with an artificial intelligence (AI) module 125. The AI module 125 inputs the sensor data into AI/machine learning (ML) models to predict overall health of a chip as well and its potential for failure. When a predetermined threshold value of a parameter for predicting failure is crossed, the AI module may transmit a signal to a "preventive actions" module 120. A threshold value may be relative to the analyzed labels (outputs) of the AI module, e.g., 125. The preventive actions module 120 may be configured to generate a signal to request remedial action. The signal may be generated for an interface, e.g., an audible alarm or visual alarm on a user interface. In some embodiments, the signal may include instructions or recommendations for further action to enable preventive action before actual failure of the MQK. In yet other embodiments, the signal may further trigger automated preventive actions before actual failure of the MQK. Examples of preventive actions may include reducing the workload on components nearing failure via firmware changes or recalling the chip for preventive maintenance. It is noted that "modules" as used herein may be programming code structured for execution by a processing unit (e.g., processor, controller) to have the processing unit perform the functionality or process described.

Chip Failure Mechanisms

To help detect failure of a MQK, one or more chip failure mechanisms 110 are evaluated. With reference to the example, chip 105, as it ages, it wears out due to electrical stress and thermal stress (TS) applied over a prolonged period of time. Electrical stress occurs due to activity in the electrical circuits creating electric fields that damage the circuit over time. Electrical stress may be manifested by Bias Temperature Instability (BTI), Hot Carrier Injection (HCl), Time Dependent Dielectric Breakdown (TDDB), and Electromigration (EM). Thermal Stress (TS) is caused by heating of circuit elements, e.g., interconnects and transistors, of an integrated chip component as they operate. These chip failure mechanisms, namely BTI, HCl, TDDB, EM, and TS are the primary cause of aging and wear out of chips and may be referenced as failure mechanisms.

BTI may be negative or positive. Negative BTI (NBTI) occurs in P-type metal oxide semiconductor (PMOS or pMOS) transistor devices stressed with a negative bias voltage. Similarly, Positive BTI (PBTI) occurs in n-type metal oxide semiconductor (NMOS or nMOS) transistor devices stressed with positive bias voltages. The stress causes defects in the silicon-silicon-oxide interface and the silicon-oxide, which are called traps, as they can trap and de-trap charge carriers. In repeated stress-destress cycles, electrons and holes become trapped in the gate oxide region causing chip degradation. The gradual change in the number of traps results in an increase/shift of threshold Voltage (Vth). As gate oxide thickness reaches 1 nanometer (nm), the Vth degradation due to NBTI/PBTI becomes a limiting factor of the circuit lifetime. As Vth increases, gate and path delay increase within a circuit. In addition, slew rates also increase within the circuit.

HCl is based on the channel carriers of transistors gaining sufficient energy, becoming 'hot', and injecting into the gate dielectric oxide when in the presence of a high electric field. This results in device degradation due to an increase in Vth.

While the impact may be similar to BTI, the mechanism is different. In BTI the transistor is stressed when a stressing bias is applied to it (−ve of pMOS, +ve for nMOS). In HCl the transistor is stressed while it switches. While BTI is partially reversible by the removal of stress, HCl has an irreversible effect. As with BTI, as Vth increases, gate and path delay increase within a circuit. In addition, slew rates also increase within the circuit.

TDDB causes gate dielectric quality degradation. When an electric field is applied to a metal oxide semiconductor field-effect transistor (MOSFET) gate, the progressive degradation of the dielectric material results in the formation of conductive path in the gate dielectric layer leading to gate leakage. The oxide-breakdown process is composed of three stages: defect generation, soft breakdown, and hard breakdown. Current gate leakage (Ig) causes the gate to be charged to a lower voltage than the power rail (Vdd). This causes an increase in gate and path delays and an increase in slew.

EM is the current-induced atomic transport generated by collisions of electrons with metal atoms. The depletion and accumulation of material creates voids and hillocks, which can lead to open and short faults, respectively. In the case of circuits operating at high frequency, voids induce delay failures because of increased resistance, before opens occur. EM impacts resistance and an increase in resistance causes interconnect and path delays as well as power-grid voltage drops.

As for TS, elevated temperatures are a major contributor to lower semiconductor reliability. Heat is generated in the Interconnect by Joule or I2R heating, and heat is generated in the devices due to transistor channel heating. If heat is not removed at a rate equal to or greater than its rate of generation, temperatures will rise. Local hot spots are also a special cause of concern. Higher temperatures impact voltage drop, signal timing, and accelerate material failure. High temperatures adversely affect all the prior failure mechanisms caused by electrical stress.

Tables I and II below summarize the failure mechanisms described above and their impact. The Tables present parameters of the circuit elements, and their impact on quantities at the circuit element and overall circuit level that influence performance and health of the chip. The parameters correspond to unique sets of features (or inputs) for AI/ML models later described below.

TABLE I parameters are further described in Table II.

| Failure mechanism | Parameters (Inputs/Features) | Impact Circuit Element | Circuit Operation |
|---|---|---|---|
| E Stress: | | | |
| BTI | Transistor: $W_t, L_t, t_{ox}, V_{ds}, V_{gs}, V_{th}, T, \alpha, t$ | Transistor: $V_{th}$ increase | Gate/Path delay, slew increase |
| HCI | Same as BTI | Transistor: $V_{th}$ increase | Gate/Path delay, slew increase |
| TDDB | Transistor: $W_t, L_t, t_{ox}, V_{ds}, V_{gs}, V_{th}, T, \alpha, t$ (+ drive tran. parms) | Transistor: $I_g$ increase | Gate/Path delay, slew increase |

TABLE I-continued parameters are further described in Table II.

| Failure mechanism | Parameters (Inputs/Features) | Impact Circuit Element | Circuit Operation |
|---|---|---|---|
| EM | Interconnect: $W_i, L_i, \beta, J, T, \alpha, t$ | InterconnectR increase | Interconnect/Path delay increase PG IR drop increase |
| Thermal stress | Interconnect $I^2R$, Tran channel heating | Adversely affects all above | |

TABLE II

Description of Table I parameters

| Transistor | | Interconnect | | General | |
|---|---|---|---|---|---|
| Param | Description | Param | Description | Param | Description |
| $W_t$ | Width | $W_i$ | Width | T | Temperature |
| $L_t$ | Length | $L_i$ | Length | $\alpha$ | Activity |
| $t_{ox}$ | Ox.thickness | $\beta$ | Resistivity | t | time |
| $V_{ds}$ | DS bias volt | J | Cur.density | | |
| $V_{gs}$ | GS bias volt | R | Resistance | | |
| $V_{th}$ | Threshold V | | | | |
| $I_g$ | Gate leakage | | | | |

As illustrated through the tables, the age-related chip failure mechanisms adversely affect the gate and path delays of the circuit. These adversely impact circuit operation within a chip. The chip failure mechanisms also degrade the power grid through voltage drop, which can also lead to chip failure. Monitoring these aspects is essential to ensure proper operation of the chip.

On Chip Monitors

Figure 2:
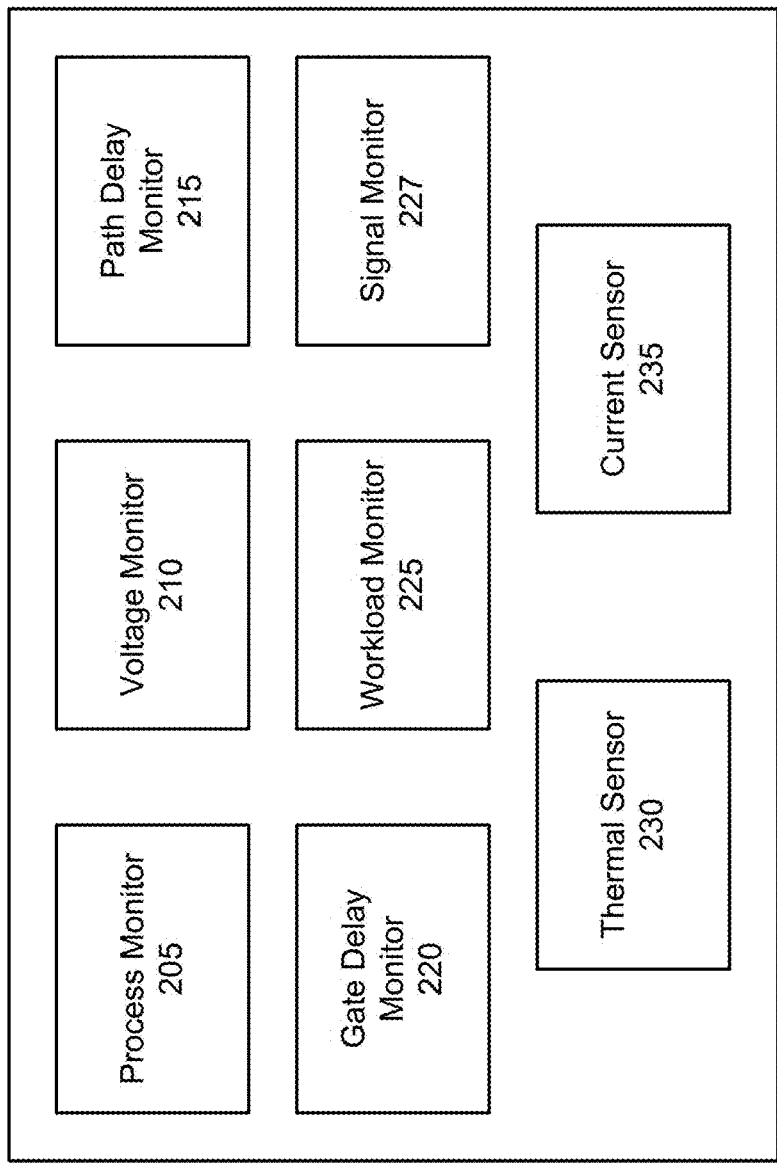
FIG. 2 illustrates an example of the embedded monitors on a chip in accordance with one embodiment.

With the failure mechanisms 110 described, FIG. 2 illustrates an example of the embedded monitors 115 on a chip in accordance with one embodiment. As previously noted, monitors also may be sensors. The embedded monitors 115 include a process monitor 205, a voltage monitor 210, a path delay monitor 215, a gate delay monitor 220, a workload monitor 225, a signal monitor 227, a thermal sensor 230, and a current sensor 235. In one embodiment there may be one or more of each monitor (or sensor) 205, 210, 215, 220, 225, 227, 230, 235 within a chip.

The process monitor, 205 may be configured to evaluate silicon speed from die to die and across die. The process monitor 205 may be structured with ring oscillators. Their reading may be used to adjust for delay and other such quantities. The voltage monitor 210 may measure multiple domain supply voltages across the chip. It may be configured to measure both supply (VDD) to ground (GND) and VDD-VDD' across core and input/output (IO) supply domains. It also may be configured to control variable supply voltage.

The path margin, or path delay monitor, 215 may be configured to measure the delay or margin of real functional paths. A functional path may be a path between a source and destination logic flip-flop. The path delay monitor 215 is configured to measure an amount of delay margin left before a signal at the end of a functional path will fail to be captured by the destination logic flip-flop. The gate delay monitor 220 is configured to measure delay across a specific logic gate (such as an inverter (INV), NAND, NOR). The gate delay monitor 220 is configured to use similar delay structures as the ring oscillator but employ a different measuring method. The workload monitor, 225 is configured to measure workload of specific circuits such as processing units (e.g., CPUs), busses and more.

The signal monitor 227 is configured to detect transitions in the selected path. A toggle rate data would provide a measure of activity. The signal monitor 227 may be configured to also monitor the duration of the 1 and 0 state of the signals. In addition, it is noted that the delay monitor 215 also may be configured to function as a signal monitor 227. The thermal sensor 230 is configured to measure temperature at a specific location of a chip. They help to detect heat dissipated and can help provide a real time thermal map of a chip. The current sensor 235 is configured to measure current along specified paths of a chip.

The data collected by the monitors (and sensors 115) is collected on chip. The chip transmits signals from the embedded monitors 115 to, for example, a cloud computing system. The cloud computing system communicates with a system within which the chip 105 is integrated. The cloud computing system may be configured with some or all of the components described with FIG. 18. The cloud computing system includes a database, e.g., database 130. By way of example, the cloud computing system receives the data collected from the monitors 115 on the chip and stores that data in the database, e.g., 130. The cloud computing system also stores artificial intelligence (AI)/machine learning (ML) program code (comprised of instructions), e.g., the AI module 125, as further described below for execution by the processor. The AI/ML program code uses the collected data from the monitors 115 as further described below.

Example Failure Analysis Process

Figure 3:
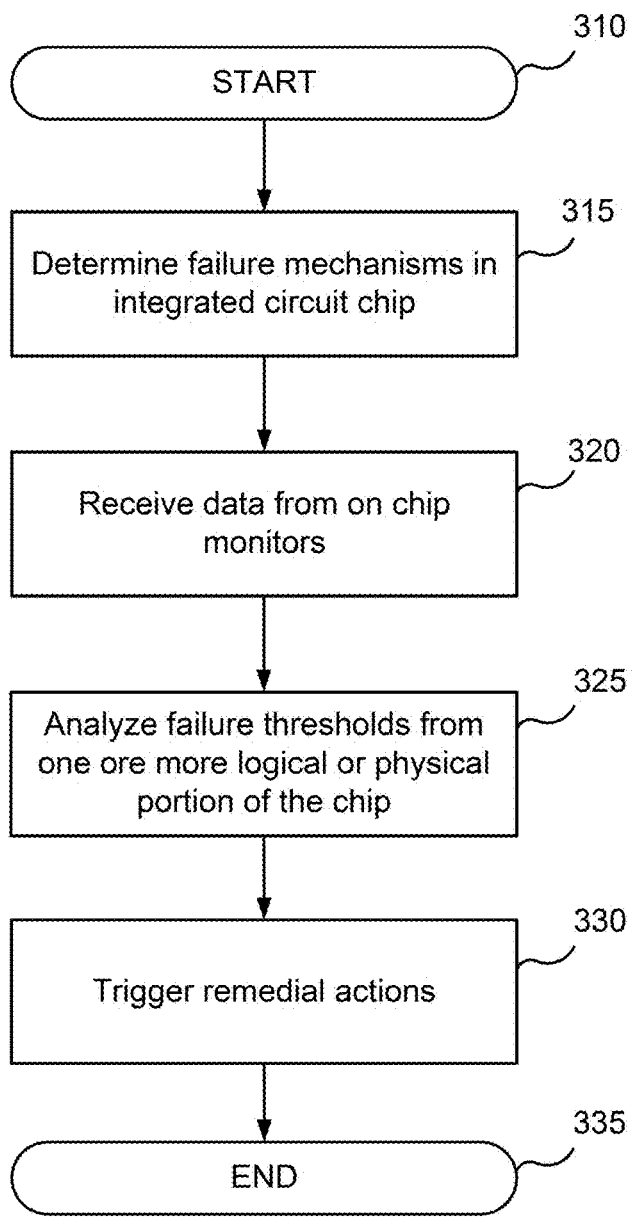
FIG. 3 illustrates a high level process to evaluate when a chip may be reaching possible failure points and take remedial action in accordance with one embodiment.

With the data collected, FIG. 3 illustrates a high level example process to evaluate when a chip may be reaching possible failure points and take remedial action in accordance with one embodiment. The process starts at 310 and determines 315 failure mechanisms in the integrated circuit chip 105. Data is received 320 from the chip monitors 115. The data may be stored in the database 130. The process analyzes 325 failure threshold data (e.g., a predefined value) from one or more logical and/or physical portions of the chip 105. Based on whether thresholds are met (or exceeded), the process triggers (or executes) 330 remedial actions before ending 335. The remedial action preferably is before a failure, though could be after, e.g., at or shortly after failure. The remedial action may include providing a notification (e.g., visual or audible) and more active countermeasures such as reducing workload to a part of a chip or changing signal frequency for certain signals within the chip.

Example of Machine Learning Process for Time Based Prediction

The disclosed configuration includes chip failure analysis leveraging machine learning. Examples of machine learning models the processes would employ may be a classic time model (e.g., auto-regressive moving average (ARIMA)), a multi-layer perceptron (MLP), recurrent neural network (long short term memory (LSTM)), or graph neural network (GNN).

Figure 4:
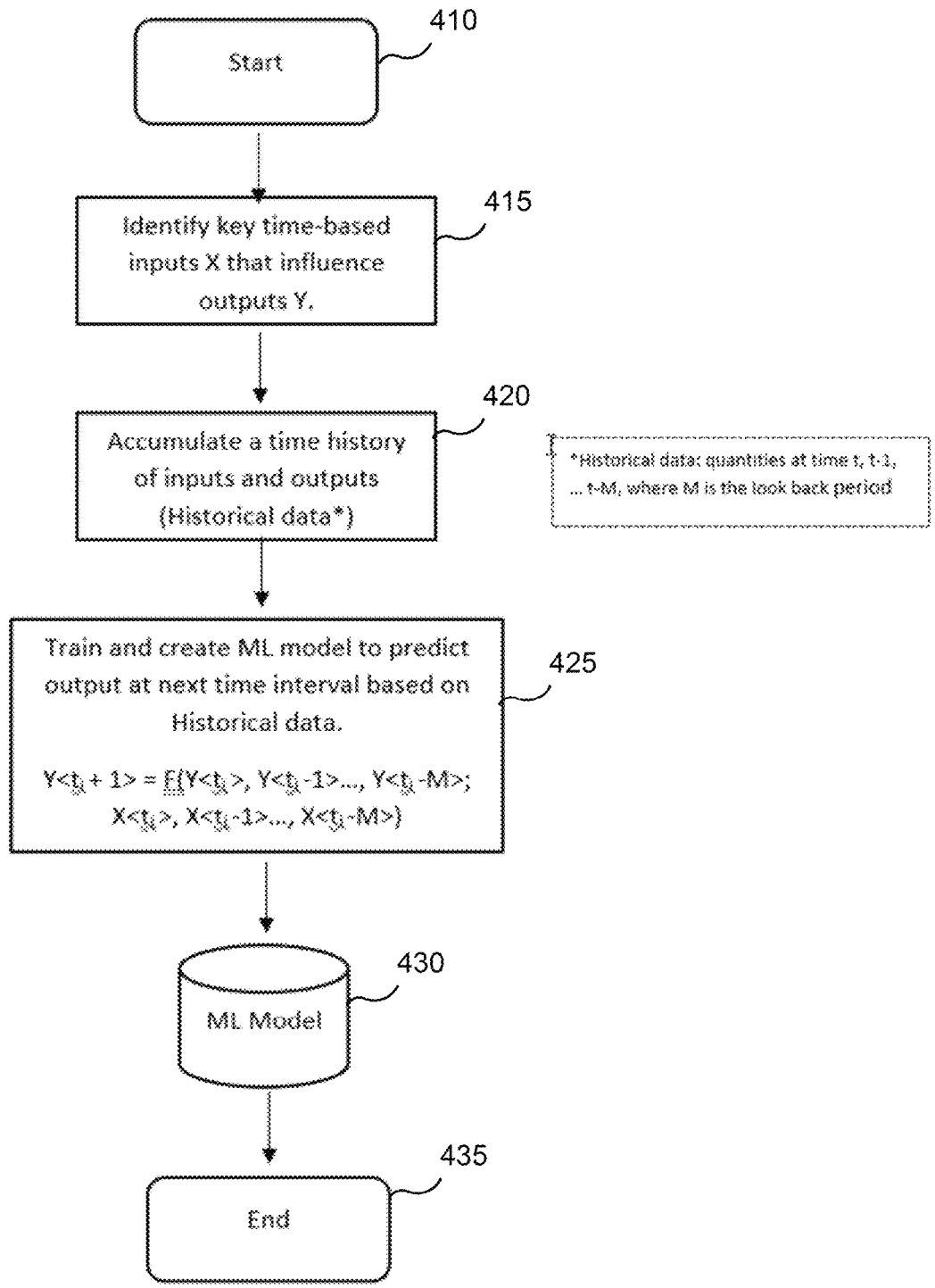
FIG. 4 illustrates an example process for training a time based machine learning model in accordance with one embodiment.

FIG. 4 illustrates an example process for a time based machine learning training model in accordance with one embodiment. The process is configured to be embodied as program code (comprised of instructions) and executable using a computing system that may include one or more of the components of the computing system as described with FIG. 18. The process starts 410 and identifies 415 key time-based inputs, X, that influence outputs, Y. The process accumulates 420 historical data that is a time history of the inputs and outputs. The historical data corresponds to quantities of time t, t−1, t−2 to t−M, where M is a look back period. The process trains and creates 425 a machine learning (ML) model to predict an output at a next time interval based on the historical data. That is:

$Y<t_i+1>=F(Y<t_i>, Y<t_i-1>, \ldots, Y<t_i-M>; X<t_i>, X<t_i-1>, \ldots, X<t_i-M>)$, where M is the look back period.

The process stores 430 the ML model in database, e.g., 130, before ending 435.

Figure 5:
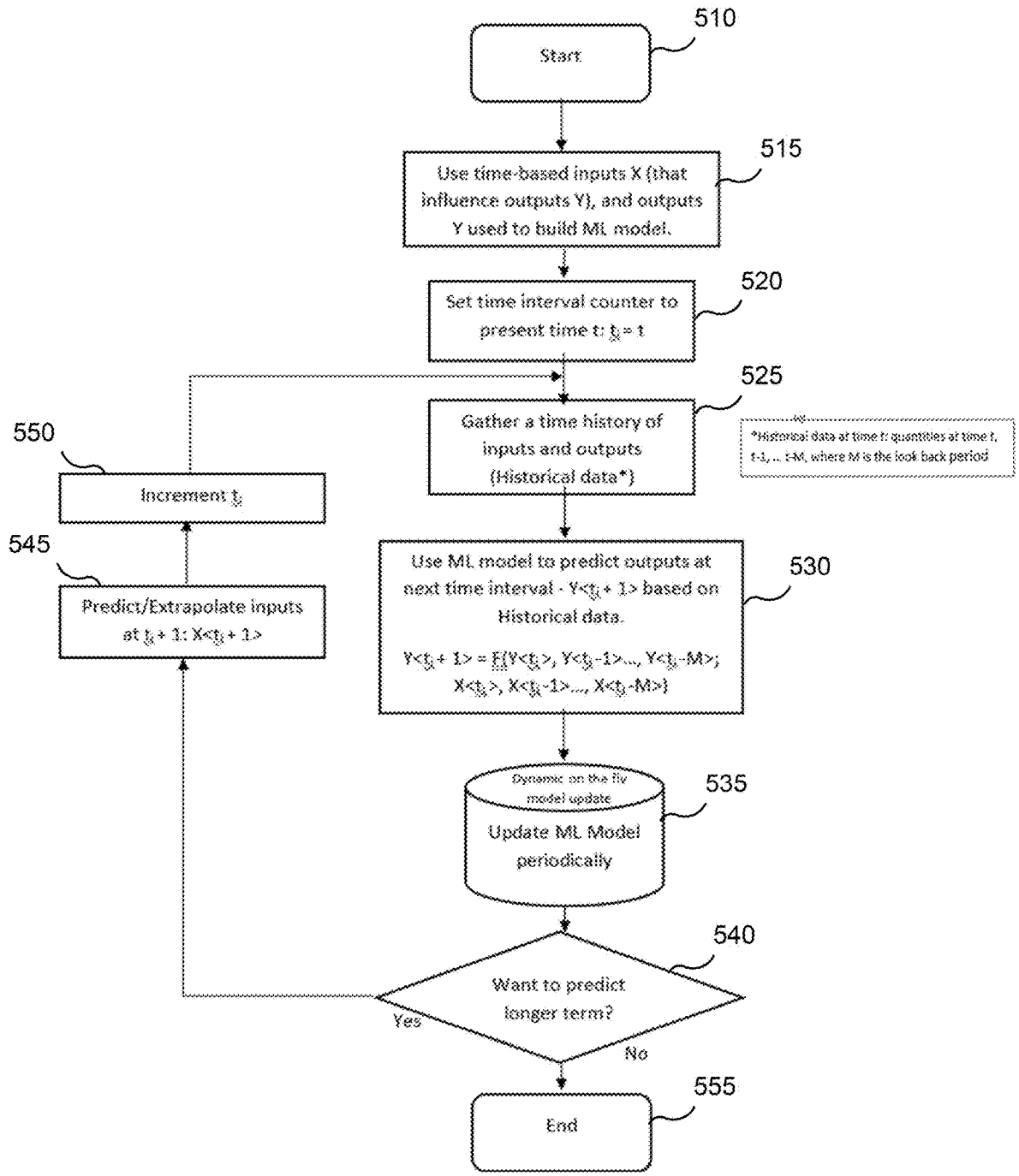
FIG. 5 illustrates an example process for prediction using a time based machine learning model in accordance with one embodiment.

FIG. 5 illustrates an example process for a time based machine learning prediction model in accordance with one embodiment. The machine learning prediction model generates a prediction. The process is configured to be embodied as program code (comprised of instructions) and executable using a computing system that may include one or more of the components of the computing system as described with FIG. 18. The process starts 510 and gathers 515 time-based inputs, X, and outputs, Y (same set as those used to build a ML model in the prior training step described in FIG. 4). The inputs, X, applied are those that influence the outputs, Y. The process sets 520 a time interval counter to present time t: $t_i=t$. The input, X, and the output, Y, may be scalar variables but also may be an input vector and an output vector, where the vectors correspond to a set of variables. The process gathers 525 historical data corresponding to a time history of the inputs and outputs. The historical data at a time, t, is quantities at time t, t−1, t−2, ..., t−M, where M is the look back period. The process applies (or uses) 530 ML model (initially built in FIG. 4) to predict outputs at a next time interval, $Y<t_i+1>$, based on the historical data. That is:

$Y<t_i+1><=F(Y<t_i>, Y<t_i-1>, \ldots, Y<t_i-M>; X<t_i>, X<t_i-1>, \ldots, X<t_i-M>)$, where M is the look back period.

The process provides for a dynamic on the fly model update to update 535 the model periodically. If the process determines 540 to predict longer term, the process predicts (or extrapolates) 545 inputs at $t_i+1$: $X<t_i+1>$ and increments 550 ti before continuing with the gathering 525 step for the next time interval. If the process determines 540 to not predict longer term, it may end 555.

Figure 6:
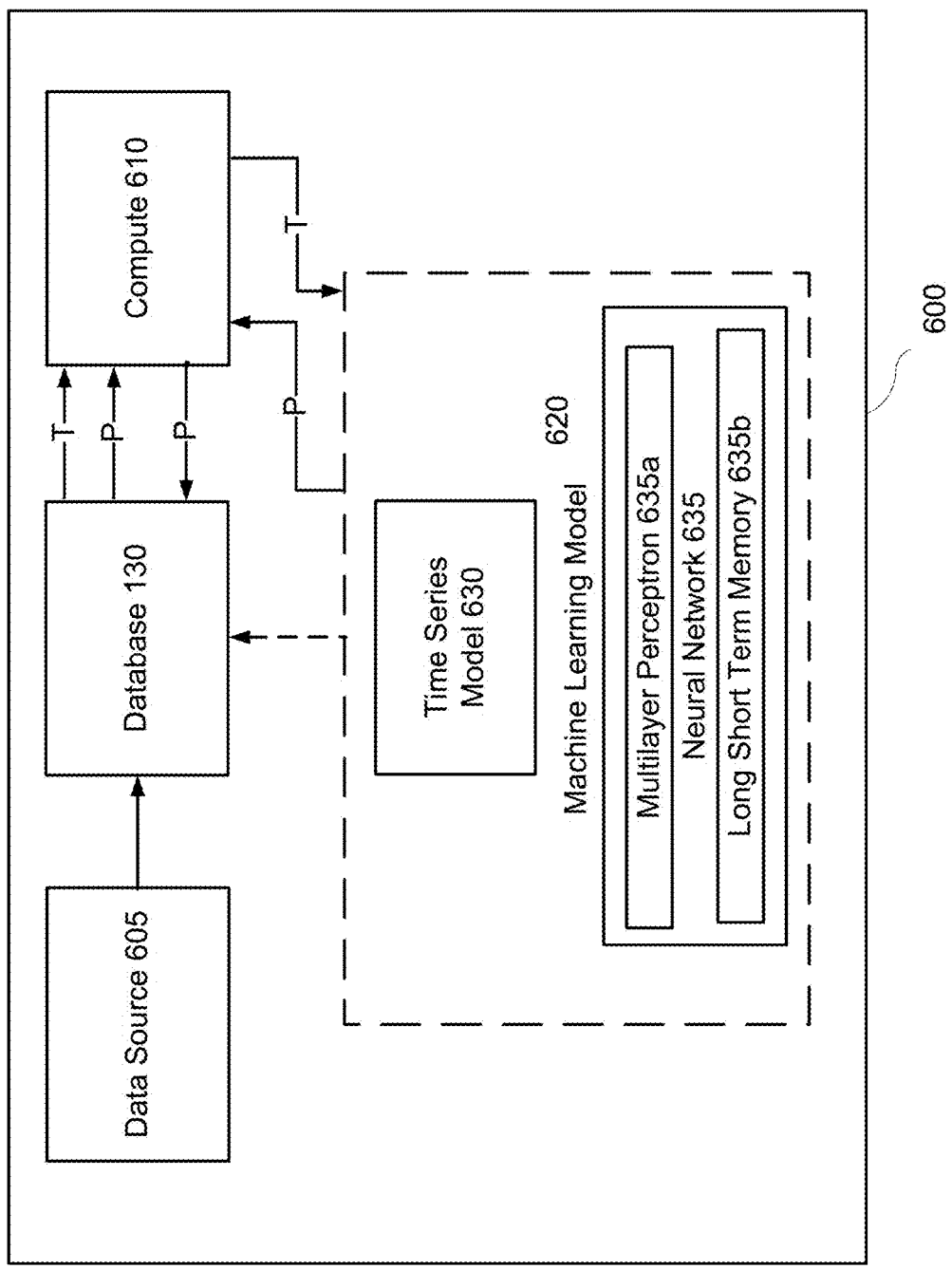
FIG. 6 illustrates an example processing block for training and prediction based on a time based machine learning model in accordance with one embodiment.

FIG. 6 illustrates an example processing block 600 for the time based machine learning models described with FIGS. 4 and 5 in accordance with one embodiment. The processing block includes data sources 605, the database 130, a compute mechanism 610, and a machine learning model 620. The machine learning model 620 may be stored within the database 130. The data source 605 may be, for example, one or more of data from monitors/sensors 115, or from equations that capture a physical phenomenon. They include inputs (or features), X, and outputs (or labels) Y. The computer mechanism 610 may be a computing system that may include one or more of the components of the computing system as described with FIG. 18. The machine learning model 625 may be structured with a time series model 630 and may further include a neural network 635, for example, a multilayer perceptron 635a or a long short term memory (LSTM) 635b.

The data of the data source 605 is stored in the database 130. The data is used by the compute mechanism 610 to train (T) the machine learning model 620, e.g., using the process described in FIG. 4. Machine learning model 620 along with the data of the data source 605 serve as an input (P) to the compute mechanism 610 which then stores predictions in the database 130 using the process described in FIG. 5. Typically, the machine learning model 620 is also stored in the database 130. It is noted that the model configurations of FIGS. 4, 5, and 6 may be within the AI module 125.

Example Using Ml for Threshold Voltage Prediction and Analysis

Figure 7:
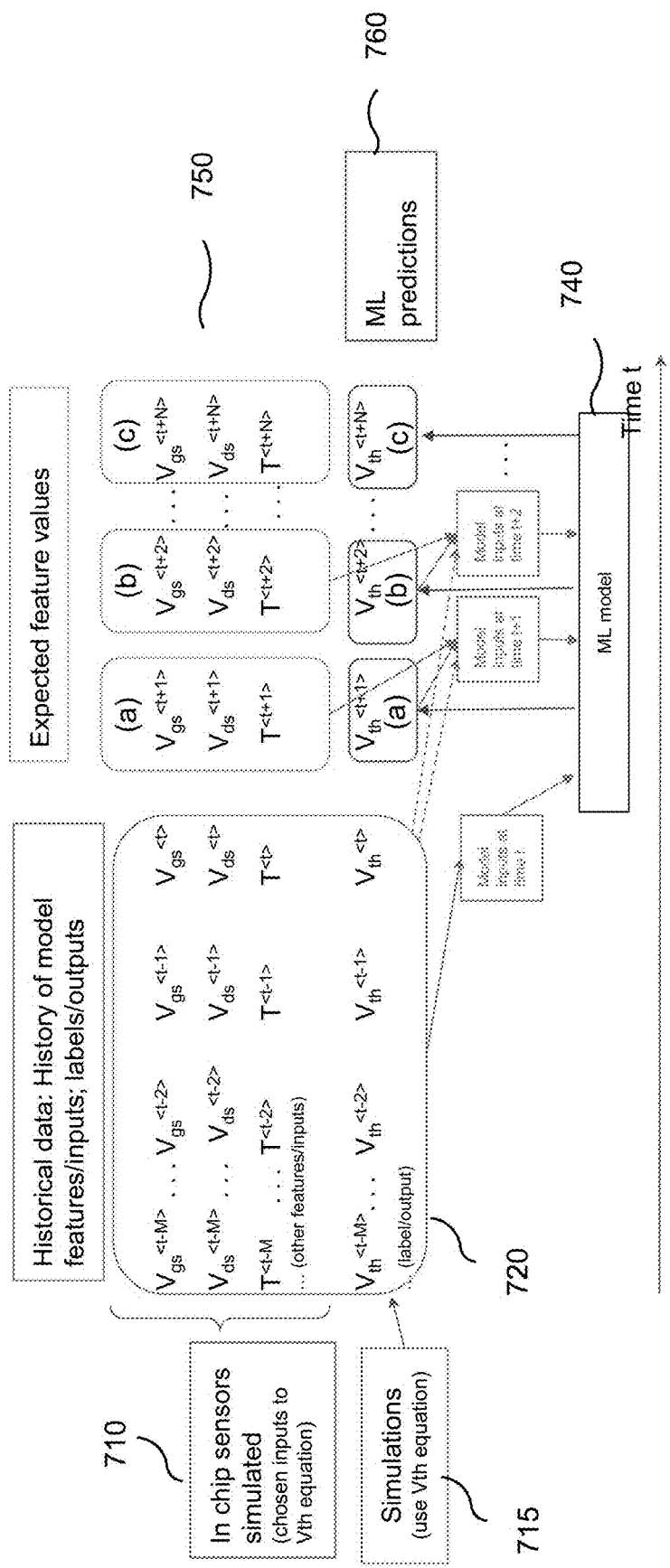
FIG. 7 illustrates an example configuration for analyzing failure threshold data in real-time based on forecasting Vth shift for PMOS transistors using a ML model in accordance with one embodiment.

The machine learning models described may be further illustrated using an example of FIG. 7. FIG. 7 illustrates an example configuration for analyzing failure threshold data in real-time using a ML model 740 in accordance with one embodiment. The ML model 740 may be structured in part similar to time based machine learning models described in FIGS. 4, 5, and 6.

In this simple example, the data sources, e.g., 605, may be data from an equation for voltage threshold (Vth) of PMOS transistors, obtained through elaborate simulations. The Vgs, Vds, T may be selected by the user to plug into the equation serve as inputs, X, and the associate Vth serve as the output, Y. This is used in place of real on chip sensors for illustrative purposes. A historical data set 720 of inputs (features) corresponding to Vgs, Vds, and T, and the output (label) corresponding to Vth is provided as inputs to train ML model 740 at a time t.

The ML model 740 is configured to provide future output (feature) values, e.g., at time t+1, t+2, ... to time t+N, where N is some future point in time. That is, the output corresponding to threshold voltage is predicted 760 at time t+1, t+2, ... up to time t+N. For example, if 't' is equal to January, the historical data from time 't' (January) may be used by the ML model to predict Vth at time t+1 (February) using the process described in FIG. 5. To provide a rolling forecast, namely a forecast for months beyond February the iterative loop shown in FIG. 5 must be employed. As an illustration, to predict Vth at time t+2 (March) 760 (b), the ML model 740 processes the historical data set 720, a projected (or expected) set of feature values of Vgs, Vds, and T at time t+1 (February) 750 (a) and prior predicted Vth in February 760 (a). If N is 12 corresponding to the calendar year, the process can predict threshold voltage through an end of a year (N=t+11).

Figure 8:
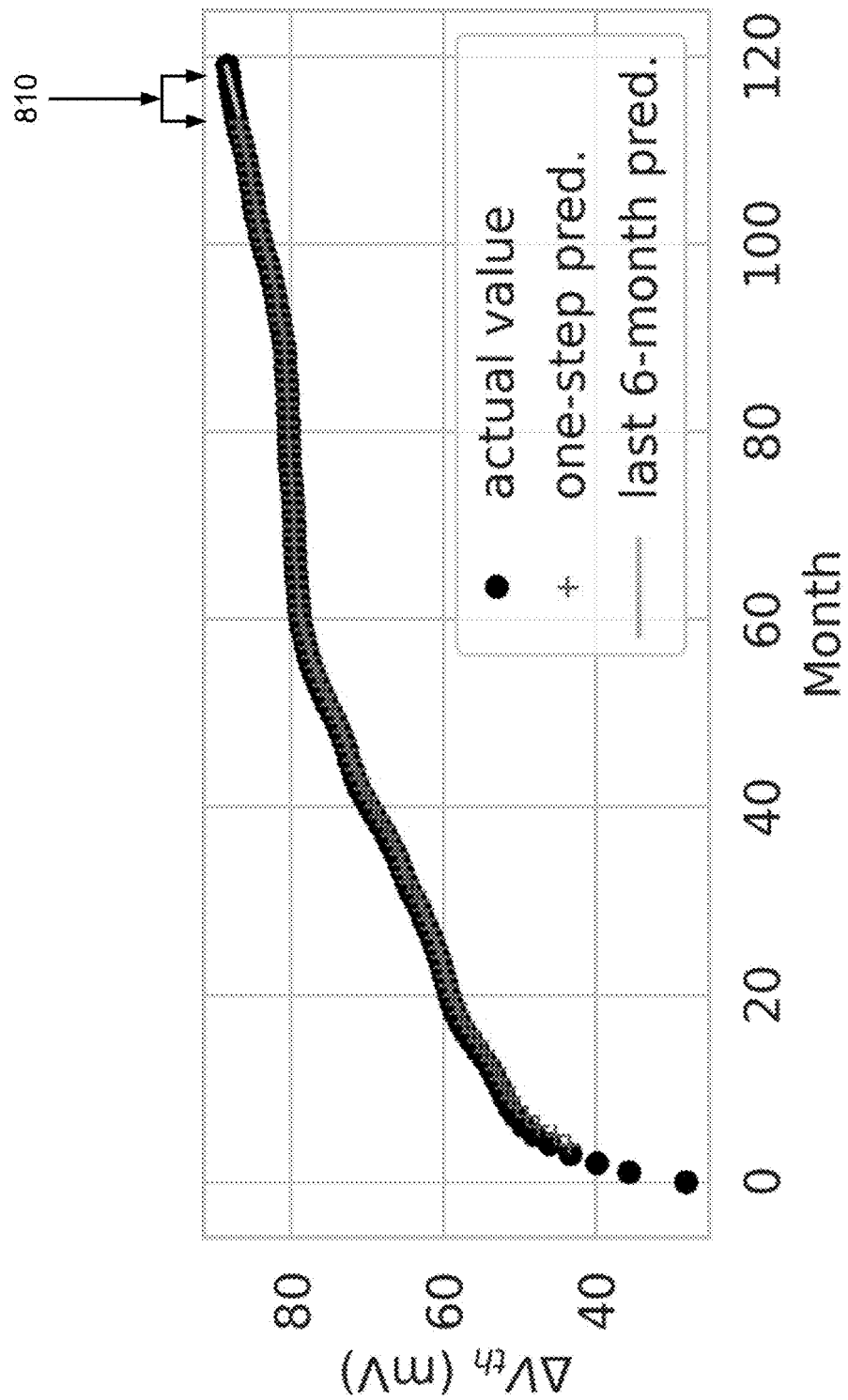
FIG. 8 illustrates an example of a next and future months forecast of Vth shift with the ARIMA model in accordance with one embodiment.

The Vth equation referred before may be of the form:

$$Vth\_shift = C\_0 * e^{\wedge}(C\_1 * V\_gs) * e^{\wedge}(-Ba/KT) * t^{\wedge}n * e^{\wedge}(C\_2 * abs(V\_ds)) \quad [1]$$

Where C_0, C_1 and, C_2 are constants fitted in degradation simulations for real designs, V_gs and V_ds are the ground to source and drain to source voltages, respectively, e^(-Ea/kT) is a Boltzmann factor, and t^n is a stress-time dependency. For a given elapsed time t (e.g., stress time), the Vth shift due to BTI may be modeled with equation [1] set forth above, which is generated using simulation and empirically fitted to the equation. The time based model described in FIG. 5 may be an auto regressive integrated moving average (or ARIMA) model. Using that model as described, Vth shift may be predicted a few months in advance. The ARIMA model may use a current change in voltage threshold at time t, ΔVth_t, and the history to predict the next month ΔVth_(t+1). The ARIMA model may use 4 lag observations and 1 moving average term. The series may be differenced once to make it stationary. FIG. 8 illustrates an example of a forecasted Vth shift with the ARIMA model in accordance with one embodiment. The forecasted values are highly accurate with a root mean square error (RMSE) of 0.17 mV. The figure shows a rolling forecast for the last 6 months prediction with high accuracy (RMSE of 0.33 mV), e.g., 810. The ARIMA model may be applied with high accuracy to forecast the next month or next few months.

An advanced deep learning technique of the machine learning model may be applied to forecast Vth shift due to BTI. Training of deep neural networks typically requires access to large datasets. To illustrate and to mimic a large data set, one may simulate ageing of 150 CMOS transistors over 10 years, at different voltage and temperature regimes using the equation [1] for Vth shift. This may be followed by splitting transistors in the chip design to train and test sets with a ratio of 80/20% respectively. The neural networks may use: (1) a multilayer perceptron (MLP) 635a and (2) a sequence model such as long short term memory (LSTM) 335b. The MLP 635a may have three fully connected layers, e.g., user determined size 32, 8 and 1, where the first 2 layers have a rectified linear unit (ReLU) activation to add non-linearity. The one-layer unidirectional LSTM has a hidden size of 16, followed by a fully-connected layer of size 1.

The input features may be the current ΔV_th, T, V_gs, and V_ds, and the most recent history, e.g., a four-month history. A current month t index may be added as a feature since the Vth degradation has a time dependency of t^n. From a current and previous four months data per the example, a change in threshold voltage, ΔV_th, is forecast for next month t+1. Input-features sequence of size corresponding to a time period of month, e.g., 4 months, may be used for both models. While LSTM naturally accepts sequence of input features, for MLP the input sequence is concatenated into a single input vector.

As noted, the model may provide future predictions beyond, for example, one month and up to the next 12 months using a yearly time period (N). Rolling forecasts may be used, where predicted ΔV_th for month t+1 is used as feature to forecast ΔV_th for month t+2 and so on to month t+12. Approximated future values of T, V_gs, and V_ds also may be needed to input the machine learning models 625. In one example embodiment, a feature extrapolation may be applied with actual values of T, V_gs, and V_ds used for projected next months.

Figure 9:
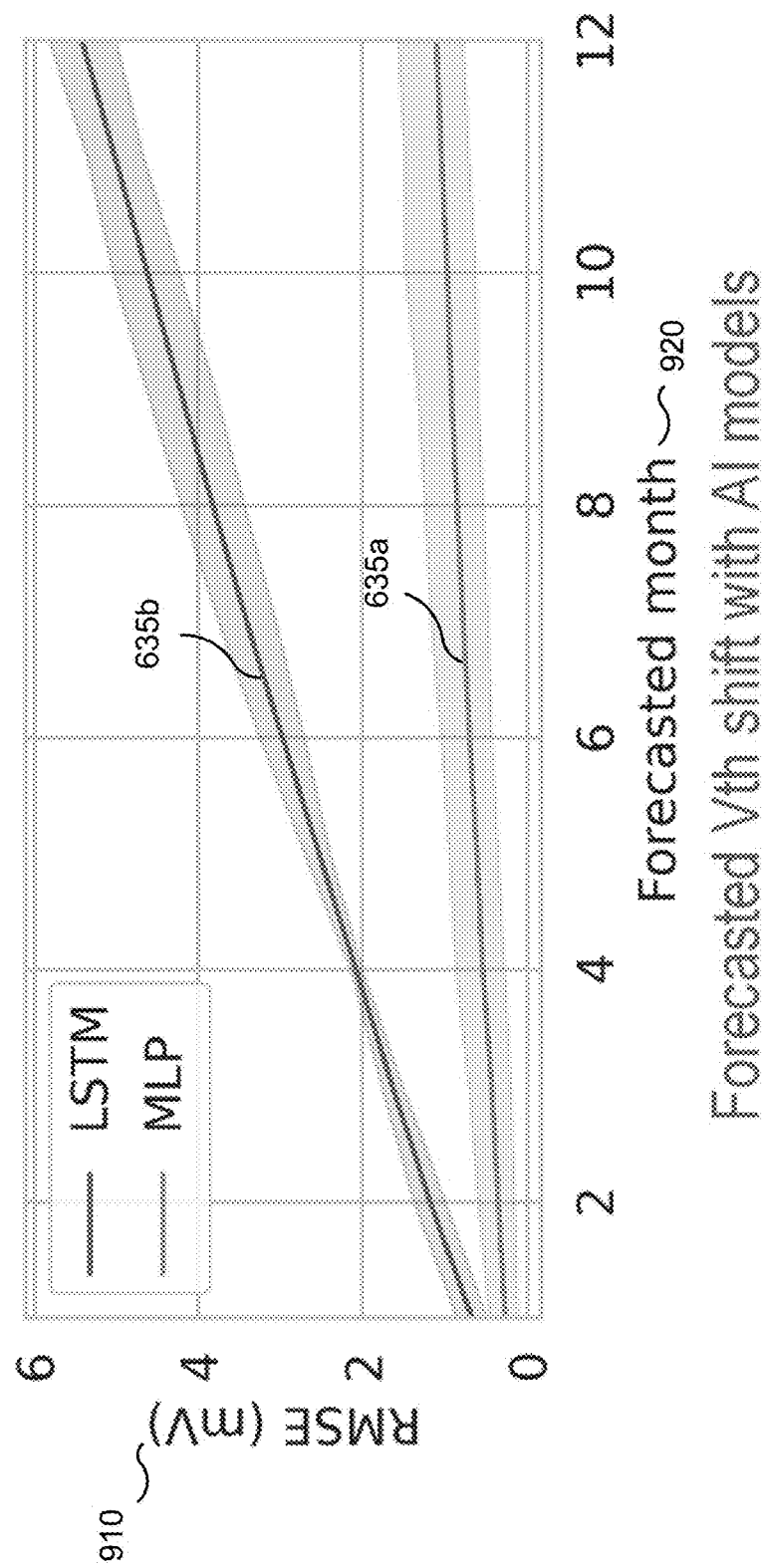
FIG. 9 illustrates an example of root mean squared error (RMSE) of predicted versus real threshold voltage shift over months using machine learning models.

FIG. 9 illustrates a root mean squared error (RMSE) 910 of predicted Vth shift over months AC20 using MLP 535a and LSTM 535b, with an example of 30 test chips. In this example up to 12-month Vth degradation is illustrated starting from months 6, 12, 18 and 24. A RMSE of 95% confidence intervals are shown in shaded areas around each of MLP 535a and LSTM 535b. Both models have a RMSE of <1 mV for the first forecasted month: with a mean RMSE of 0.66±0.11 and 0.27=0.10 mV for MLP and LSTM, respectively. However, as expected, the RMSE grows as we predict at longer terms. For the 12th forecasted month, MLP has better scores with a mean RMSE of 1.10±0.24 mV compared to 5.41±0.24 mV for LSTM. Further tuning of LSTM may provide improved results.

Example for Predicting Overall Chip Failure

The techniques described may be leveraged to predict overall chip degradation and subsequent failure. One aspect of circuit impact induced by failure mechanisms 110 involves progressively increasing gate, interconnect, and path delay that over time will cause signal timing violation. Accordingly, it is beneficial to monitor and predict delays before their failure thresholds are crossed. The comparison of predicted delays against their failure thresholds serves as a proxy for monitoring the health of the chip and enable its failure prediction.

Figure 10:
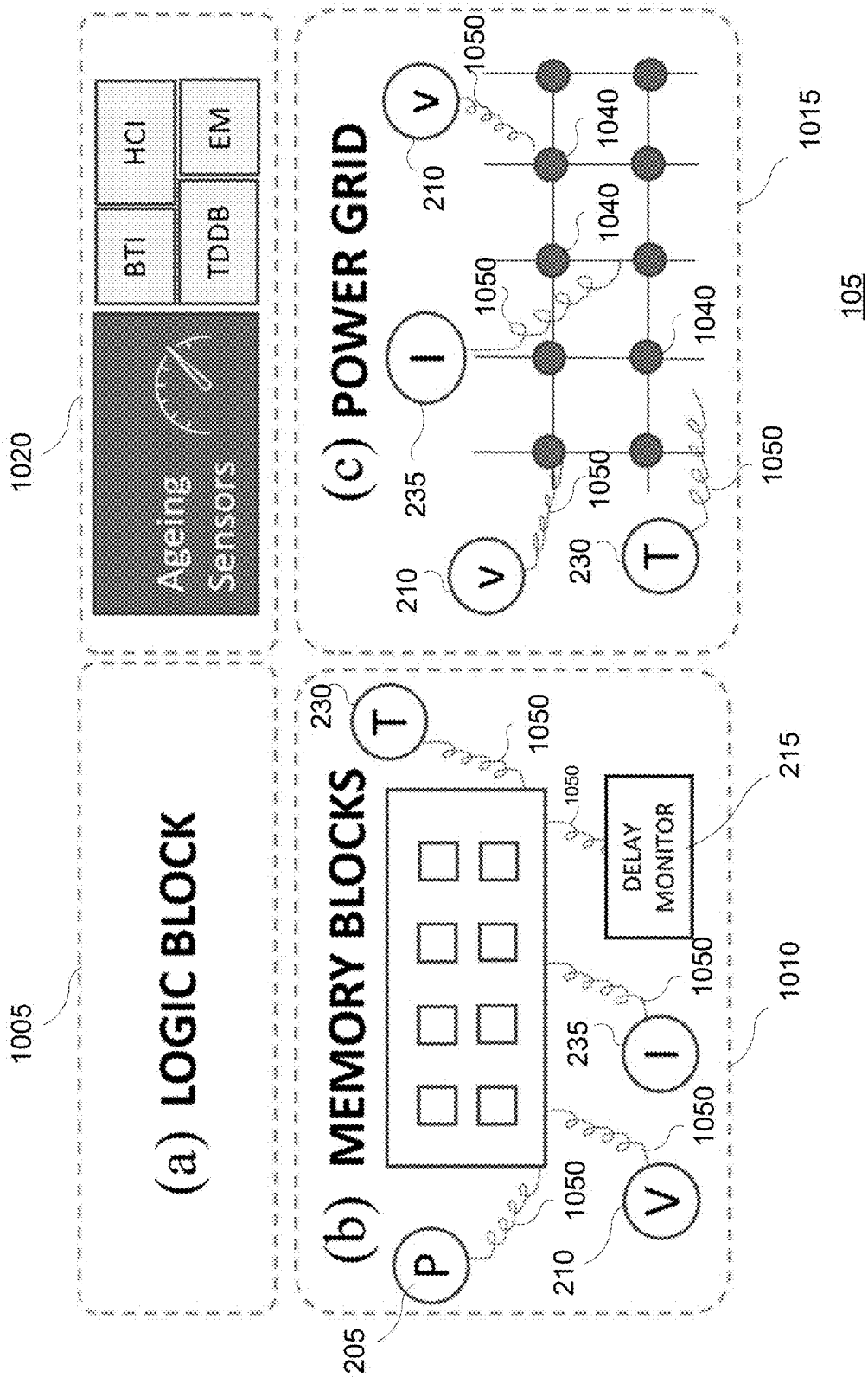
FIG. 10 illustrates an example embodiment of IC chip components affected by aging for which health may be evaluated in accordance with one embodiment.

FIG. 10 illustrates an example embodiment of a conceptual view of a chip, e.g., 105, to evaluate chip health in accordance with an embodiment. A chip 105 may be divided for evaluation based on logical (or conceptual) chip components. The chip components may be a logic block 1005, a memory block 1010, and a power grid 1015. There also may be a chip component of aging sensors (or monitors)

1020 that may be dispersed through the chip 105 to monitor overall health of the chip. It is noted that there may be one or more of each on a chip 105. The logic block 1005 and memory block 1010 are chip components comprising circuits structured with circuit elements. Further, the power grid 1015 is a chip component comprised primarily of circuit interconnects. The aging sensors 1020 may include one or more of the embedded monitors and sensors that are similar to those described with FIG. 2 (e.g., monitors (and sensors) 115). The disclosed configuration is structured so that predicting failure in any one or more of the logic blocks 1005, the memory block 1010, or the power grid 1015 allows for predicting chip failure.

The logic block 1005, the memory block 1010, and the power grid 1015 each have one or more monitors 115 coupled within them. Examples of monitors 115 within the logic block 1005, the memory block 1010, and the power grid 1015 include, for example, the process monitor (P) 205, the voltage monitor (V) 210, the delay monitor 215, the thermal sensor (T) 230, and the current sensor (I) 235. As these are examples, FIG. 10 illustrates logical connections with a squiggle line 1050.

In addition to the monitors as noted within the logic block 1005, the memory block 1010, and the power grid 1015, aging sensors 1020 also may be on placed at dispersed locations on the chip. The aging sensors 1020 may be used to monitor data corresponding to failure mechanisms 110 such as BTI, HCI, TDDB, and EM.

Example of Logic Block Failure Analysis Process

Figure 11:
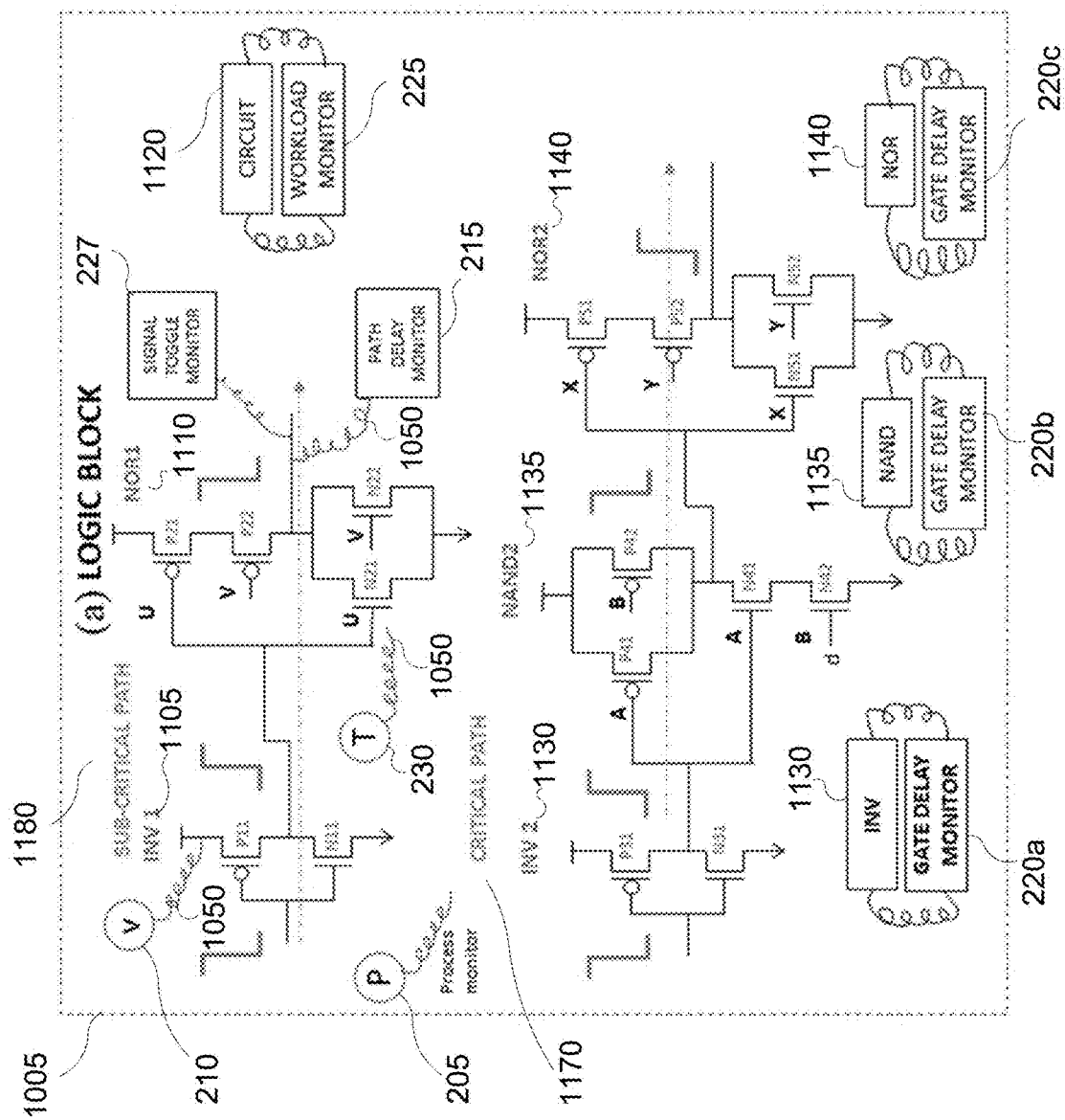
FIG. 11 illustrates a critical path and a subcritical path of a logic block for failure prediction in accordance with an embodiment.

Using an AI/ML processing model, for example, as described in FIGS. 4, 5, and 6, failure may be detected for the logic block. Referring to FIG. 11, illustrated is a critical path 1170 and a subcritical path 1180 of a logic block, e.g., 1005, that may be analyzed for failure prediction in accordance with an embodiment. Predicting critical path 1170 and sub-critical path 1180 path delays as they reach failure thresholds may cause signal timing errors of the logic block 1005 that, in turn, maybe be indicative of failing chip 105 health.

Monitoring and predicting delay along the critical path 1170 and the sub-critical path 1180 helps monitor failure potential and health of the entire logic block. As previously illustrated, prediction of Vth shift of a MOS transistor can be addressed using the disclosed AI techniques, these in turn, may be applied to solve for predicting path delay. As previously noted, the AI module 125 may use a machine learning (ML) model that may be applied to predict new output given new inputs. In the case of the predicting path delay (or path delay prediction), an output may be the path delay, and inputs may be all the inputs (or features) that will influence the path delay. Table I above established all the influencing parameters/inputs/features that may affect the path delay because of aging and wear out. Hence, these parameters of the transistors and interconnects along the critical path will constitute the inputs/features of the AI/ML model.

The sensors shown along the sub-critical/critical paths provide the inputs, or features, of AI/ML model for path delay at a first time e.g., a present time. Using present and historical data of the features and possibly a projection of the features in the future, the AI/ML model predicts the path delay in the future. The AI/ML model also uses present and historical data of the outputs/labels. When a path delay is predicted to cross a failure threshold, the preventive actions module 120 may be notified to take preventive actions. For example, the preventive action module may generate an audio notification, e.g., an alarm, and/or a visual notification, e.g., information displayed in a user interface of a computer system. The preventive actions module 120 may automatically trigger remedial action. The remedial action may include tweaking a frequency or a voltage of operation for continued functioning of the chip, transmitting a notification signaling to replace the chip (or part), or transmitting a notification recommending one or more alternates to use rather than the equipment with the failing chip.

In the context of FIG. 11, path delay may be predicted multiple ways. For example, in a first example process sub-critical path delay may be predicted with ARIMA/MLP. Here, the process predicts the future path delay using features such as path transistor and interconnect parameters (e.g., described in Table I as (Parameters)), temperature, voltage, signal activity and the delay readings along a specific signal path. In this context, loading the sub-critical path with path delay monitors is not an issue so that path delay may be available as label (known output, though at present time) and used for AI training. Hence, sub-critical path delay prediction can be performed along the same lines further described below. It is noted that besides ARIMA/MLP, other models such as a LSTM ML model, may be used for predicting sub-critical path delay.

Figure 12:
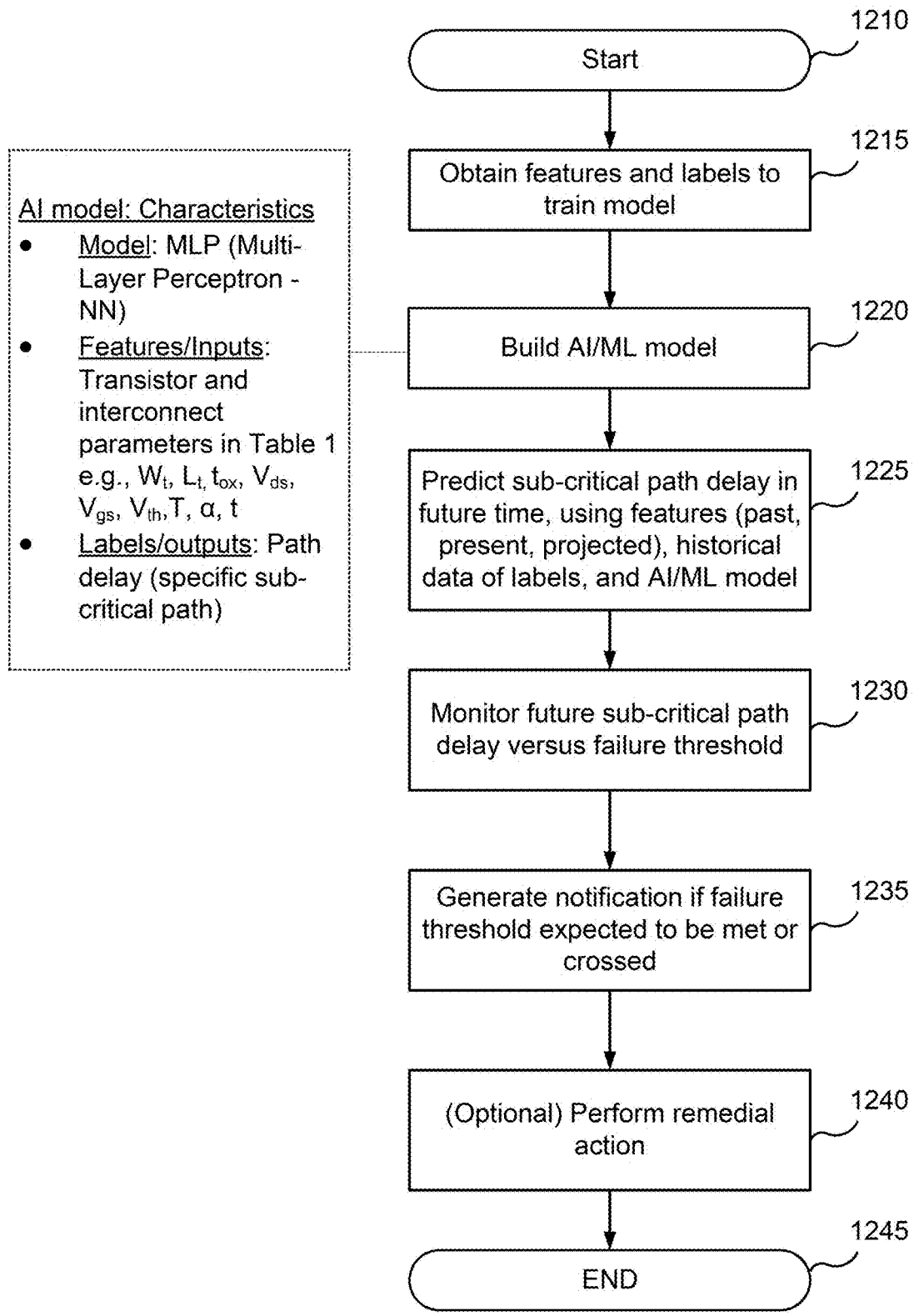
FIG. 12 illustrates a flowchart of an example process for chip failure prediction using sub-critical path delay prediction with ARIMA/MLP for a logic block in accordance with one embodiment.

FIG. 12 illustrates a flowchart of an example process for chip failure prediction using sub-critical path delay prediction with ARIMA/MLP for a logic block, e.g., 1005, in accordance with one embodiment. The process may be executed through the monitors 115, the AI module 125 and/or the preventive actions module 120 described previously. The process starts 1210 and obtains 1215 features (inputs) and labels (outputs) to train an AI/ML model. The trained model is used to build (or generate) 1220 an AI/ML model, for example, using an ARIMA/Multilayer perceptron (MLP) model. The model may be trained and built by the AI module 125. The characteristics of the model may include a MLP neural network model. It may have inputs (features) that are transistor and interconnect parameters in Table 1, e.g., Wt, Lt, tox, Vds, Vgs, Vth, T, $\alpha$, t. and are collected using the monitors (including sensors) 115 on the chip 105. The outputs (labels) of the model include path delay (specific sub-critical path).

The process predicts 1225 a sub-critical path delay in future time using features from the past, present and projected as well as the built AI/ML model. The historical data of the labels are also used as input to the process. The process monitors 1230 future sub-critical path delay verses a failure threshold, e.g., predefined path delay threshold. A notification is generated 1235 if a failure threshold, e.g., predefine path delay threshold, is expected to be reached, e.g., met or exceeded (crossed). The process may optionally perform 1240 a remedial measure, in response to an expectation that a failure threshold is likely to be reached before ending 1245. In some embodiments, the remedial measures may be automatically executed.

Second example process to predict path delay for the configuration in FIG. 11 is critical path delay prediction using sub-critical path delays along with a graph neural network (GNN). GNNs have nodes and connections (edges). In this context, transistors are nodes and interconnect, which are connections. Critical paths, e.g., critical path 1170, may not have path delay monitors as they are likely to load the critical path and increase its delay which is already at a critical level, thereby leading to failure of the critical path (its delay would cross a failure threshold). The process uses GNN to predict critical path delays based on delay data on sub-critical paths and path topology characteristics.

With supervised learning, large sets of labeled data may need to be trained. Training data of sub-critical paths may be generated using sensors of the required features (or inputs) and target (or outputs). The training data spans diverse path topologies, workloads, and voltage/temperature regimes to make a robust model that generalizes to unseen critical paths. The model may be deployed in real-time to periodically predict next-month path delays of the required critical paths.

Figure 13:
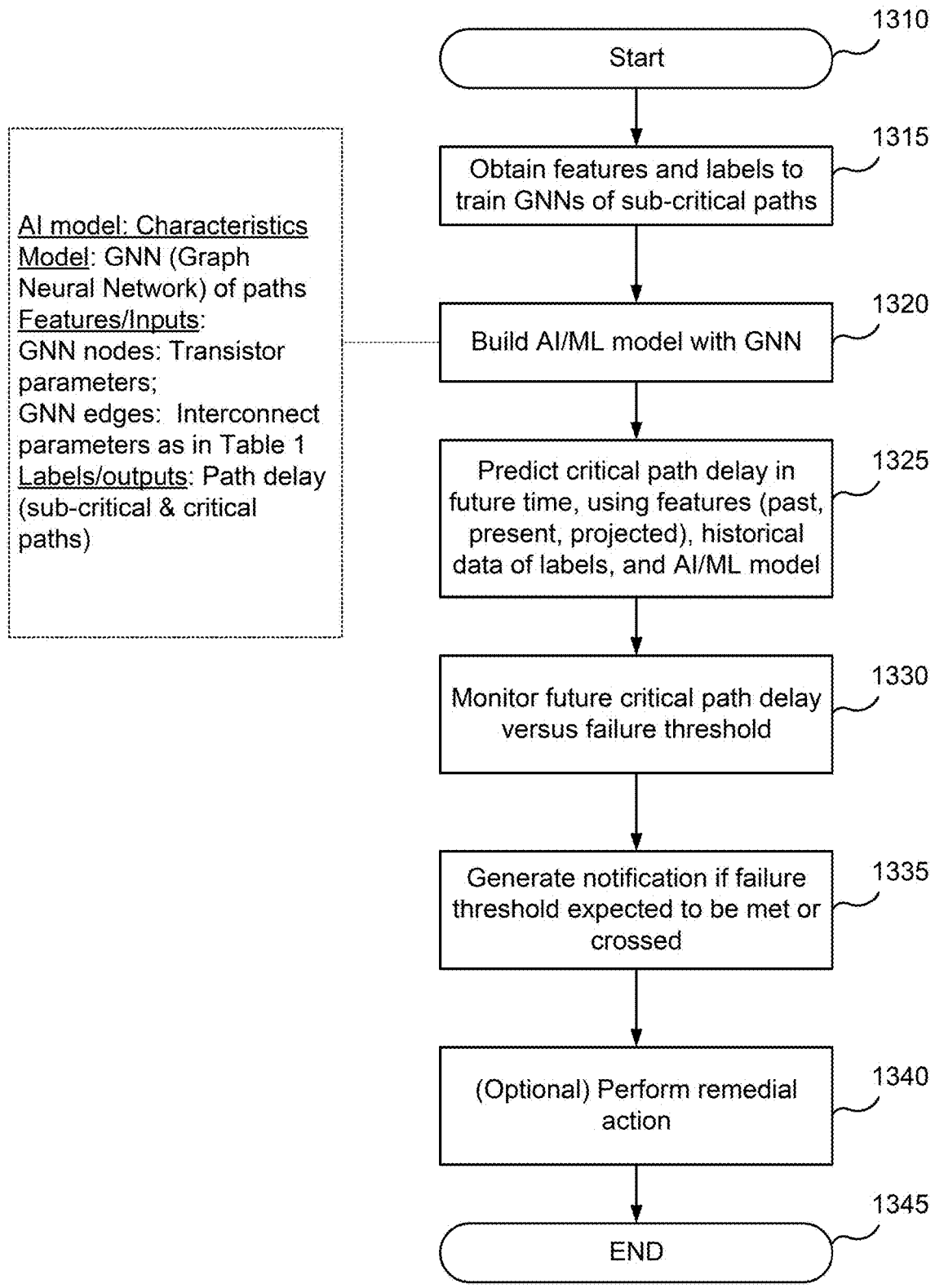
FIG. 13 illustrates a flowchart of an example process for chip failure prediction based on critical path delay prediction using sub-critical path delays with GNN for a logic block in accordance with one embodiment.

FIG. 13 illustrates a flowchart of an example process for chip failure prediction based on critical path delay prediction using sub-critical path delays with GNN for a logic block in accordance with one embodiment. The process may be executed through the monitors 115, the AI module 125 and/or the preventive actions module 120 described previously. The process starts 1310 and obtains 1315 features (inputs) and labels (outputs) to train GNNs of sub-critical paths. The features and labels are noted in Table I above and are collected using the monitors (including sensors) 115 on the chip 105. The trained model is used to build (or generate) 1320 an AI/ML model with GNN. The model may be trained and built by the AI module 125. The characteristics of the model may include a GNN neural network model. It may have inputs (features) that are GNN node features and GNN edge features. The node features may be transistor parameters as shown in Table 1 above and the edge features may be interconnect parameters as shown in Table 1. The outputs (labels) of the model include path delay (sub-critical path and critical path).

The process predicts 1325 a critical path delay (which may be unseen) using features from the past, present and projected as well as the built AI/ML model with GNN. The historical data of the labels are also used as input to the process. The process monitors 1330 future critical path delay verses a failure threshold, e.g., predefined path delay threshold. A notification is generated 1335 if a failure path delay threshold is expected to be reached, e.g., met or exceeded (crossed). The process may optionally execute 1340 an automated remedial measure, e.g., in response to an expectation that a failure threshold is likely to be reached before ending 1345.

Yet another example process to predict path delay is critical path delay prediction based on gate delay monitors and sub-critical path delay prediction. The critical path 1170 is composed of individual gates. Summing the delays of the individual gates will provide the delay of the critical path 1170. In the example logic block 1005 shown in FIG. 11, a process predicts the delays of individual gates to predict the delay of the critical path 1170. To predict the delays of the individual gates the gate delay monitors 220a, 220b, 220c may be used. Gate delay monitors 220a, 220b, 220c are used to monitor several candidate gates. Using the gate delays and the set of features captured in Table I, an AI model that predicts gate delay for each type of gate is built. The gate delays are predicted along the critical path 1170 given specific conditions of V, T etc. The sum of predicted gate delays will now provide the predicted critical path delay.

This example process may be further enhanced by examining how the above approach fares on sub-critical path 1180 delays compared to an alternate acceptable (and accurate) calculation of path delay. The first process for predicting path delay described above that provides an approach to predict sub-critical path delays may serve as the alternate. Comparing the predicted path delays of the gate delay summation method and that of first process can provide a factor β, where β is the factor to multiply the gate delay summation method. Now the critical path delay obtained using the gate delay summation method can be enhanced by multiplying it with a tweaked β of a similar sub-critical path.

Figure 14:
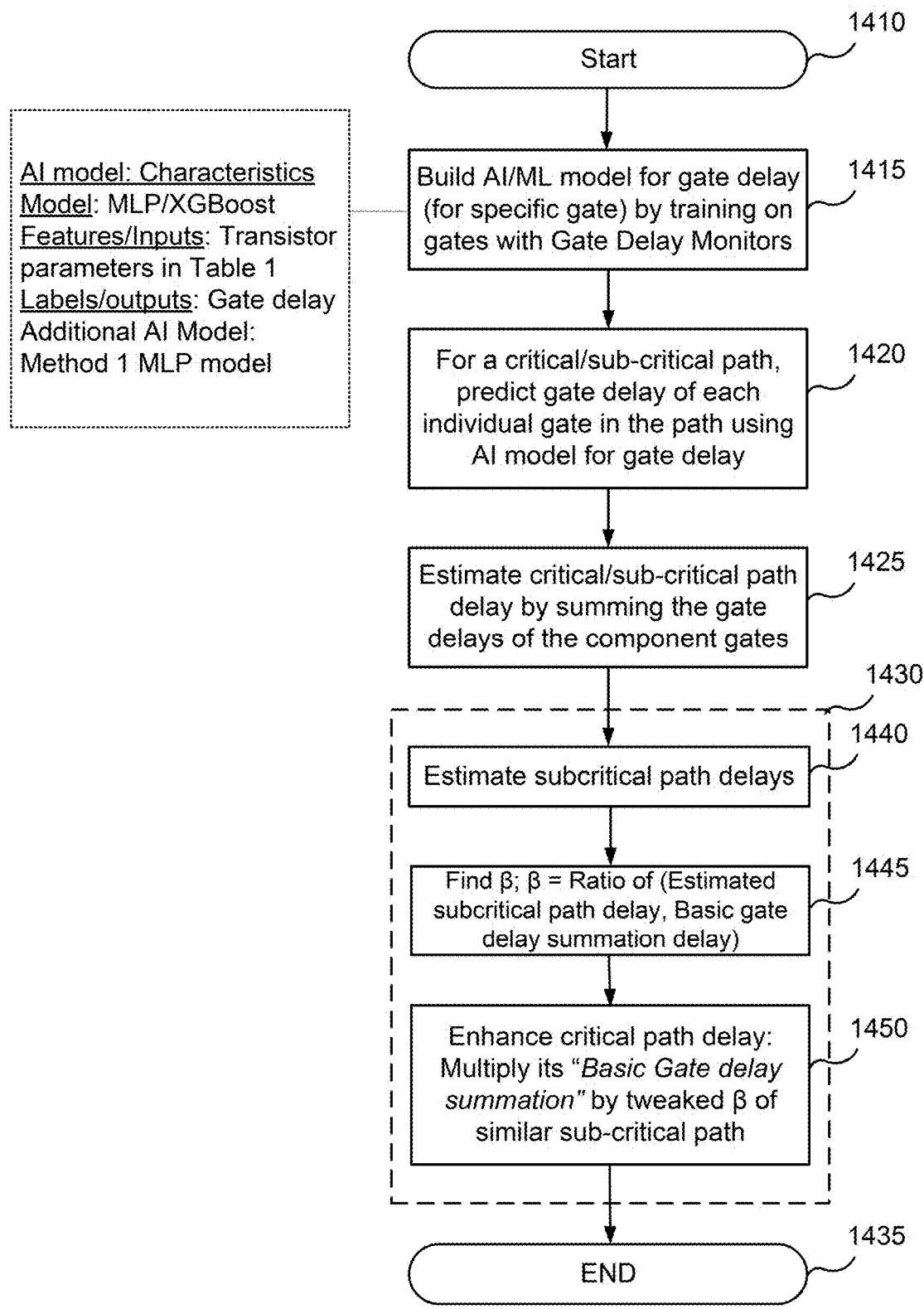
FIG. 14 illustrates a flowchart of an example process for chip failure prediction based on critical path delay prediction using gate delay monitors and sub-critical path delay prediction for a logic block in accordance with one embodiment.

FIG. 14 illustrates a flowchart of an example process for chip failure prediction using critical path delay prediction based on gate delay monitors and sub-critical path delay prediction for a logic block in accordance with one embodiment. In some embodiments, it may not be possible to have gate delay monitors 220a, 220b, 220c for all varieties of gates. In such embodiments, gate delay monitors may be inserted for few key gates and the AI models for delays built for them. Extrapolating these models, AI delay models will need to be built for a variety of gates. In this example, the process starts 1410 and builds (or generates) 1415 an AI/ML model for gate delay (for a specific gate) by training on gates using data from gate delay monitors. The model may be trained and built by the AI module 125. The characteristics of the model may include, for example, MLP/XGBoost model. It may have inputs (features) the transistor parameters as shown in Table 1. The outputs (labels) of the model are a gate delay. The AI model may be augmented with another model, for example, the model described in FIG. 12.

For a critical path 1170 and/or sub-critical path 1180, the process predicts 1420 gate delay of each individual gate in the path using the AI/ML model for gate delay. The process estimates 1425 a critical path delay and/or sub-critical path delay by summing the gate delays of the component gates. This may be referred to a gate delay summation process. The process may improve 1430 the gate delay summation process. Specifically, the improvement may use the process described with FIG. 12 to estimate 1440 sub-critical path delays and find (or identify) a value B. The value B is the ratio of the delay from applying the process described in FIG. 12 and the basic gate delay summation process (1425). The process further enhances 1450 the critical path delay by multiplying the basic gate delay summation delay by a tweaked β of a similar sub-critical path. The process may then end 1435.

Example of Memory Block Failure Analysis

As with predicting the health of a logic block, e.g., 1005, to determine whether a chip may fail, predicting the health of a memory block, e.g., 1010, also may be used to determine whether a chip may fail. Memories such as static random access memories (SRAMs) are characterized by several performance metrics. Examples include read/retention static noise margin, write margin, read current, and minimum retention voltage. Each of the performance metrics have a design specification for fault free operation. Most of the memory performance metrics of the memory are degraded by the failure mechanisms previously described. The task at hand would be to predict the degrading performance metrics of memory cells due to stress over time and send notifications as they reach predefined failure thresholds.

Figure 15:
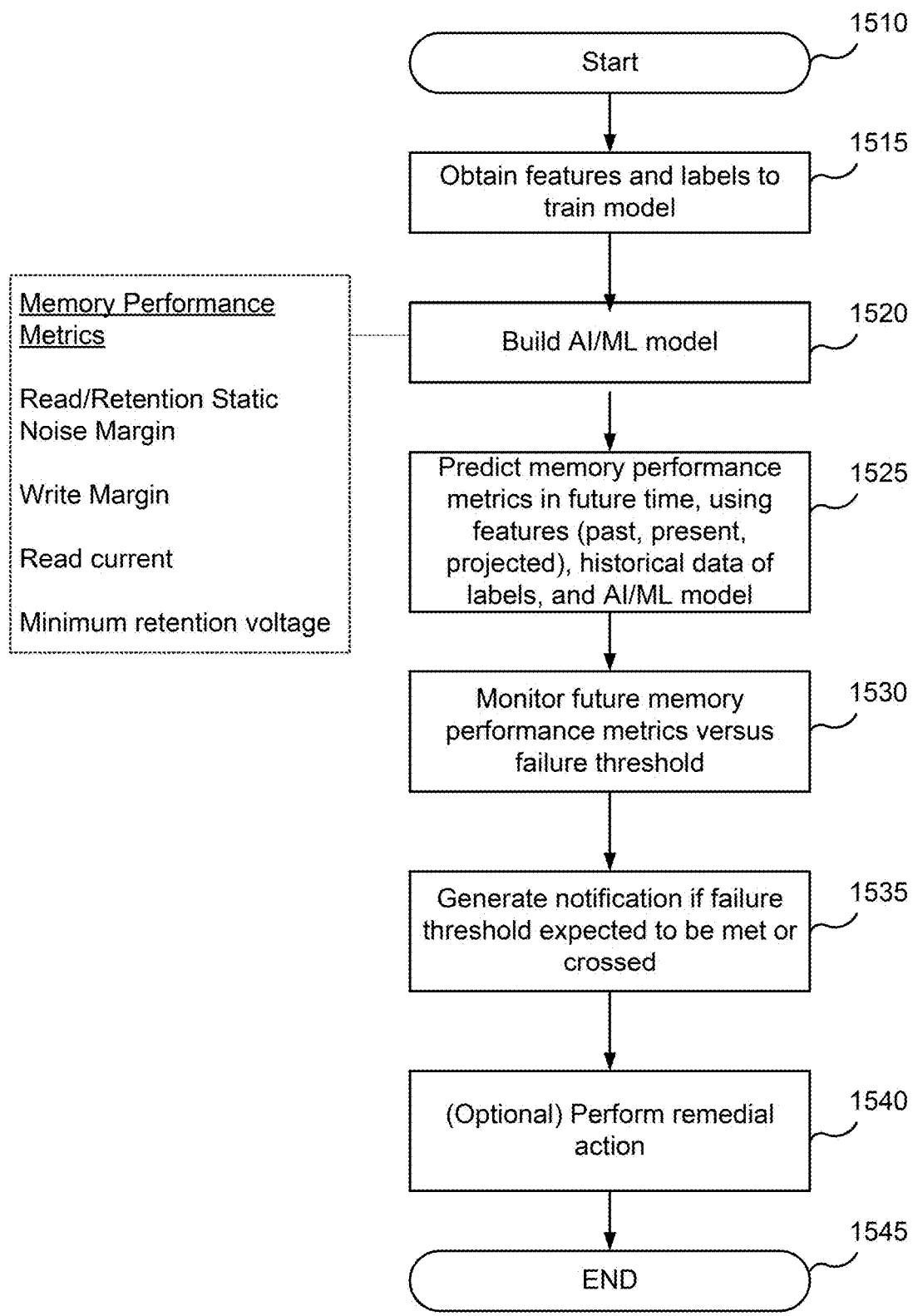
FIG. 15 illustrates a flowchart of an example process for chip failure prediction for a memory block in accordance with one embodiment.

FIG. 15 illustrates a flowchart of an example of a process for chip failure prediction based on a memory block, e.g., 1010, in accordance with one embodiment. The process starts 1510 and obtains 1515 features and labels to train a model. The process builds (or generates) 1520 an AI/ML model and predicts 1525 memory performance metrics in future time using past, present, and projected features. The historical data of the labels are also used as input to the process. The memory performance metrics which serve as labels/outputs of the AI/ML model may include read/retention static noise margin, write margin, and read current, and minimum retention voltage. The input features include transistor and interconnect parameters as shown in Table I. The process monitors 1530 future memory performance metrics versus a predefined failure threshold. If a failure threshold is expected to be reached, e.g., met or exceeded (crossed), the process generates 1535 a notification. The process may perform 1540 an optional remedial action before ending 1545. The optional remedial action may be automatically executed.

Example of Power Grid Failure Analysis

Similar to predicting the health of a logic block, e.g., 1005, or a memory block, e.g., 1010, to determine whether a chip may fail, predicting the health of a power grid, e.g., 1015, also may be used to determine whether a chip may fail. The power grid 1015 (or a Power Ground) (PG) network is a mesh of interconnects that supply power to the entire chip 105. The power grids are designed to supply power at the right level of voltage to all the components of the chip. With increased current densities in lower technology nodes Electromigration (EM) adversely affects the power grid with increased resistance of the interconnects and therefore cause larger IR voltage drops. Eventually the IR drops can reach limits that will cause malfunctioning of the chip. Predicting the voltage at key nodes of the power grid in advance allows the system to trigger an alert in time to take remedial action before failure.

Figure 16:
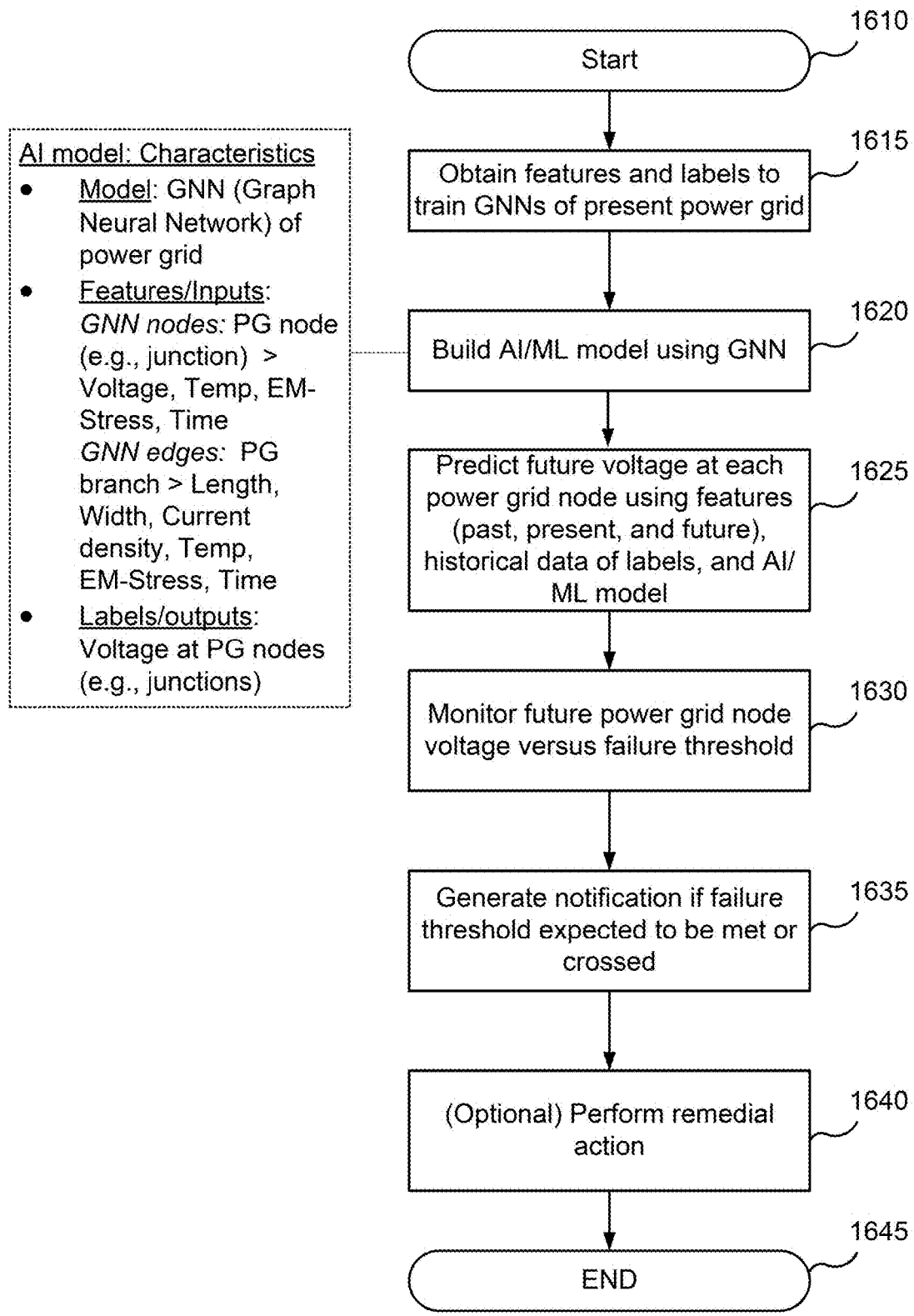
FIG. 16 illustrates a flowchart of an example process for chip failure prediction for a power grid in accordance with one embodiment.

FIG. 16 illustrates a flowchart of an example process for chip failure prediction based on a power grid voltage prediction in accordance with one embodiment. The process may be executed through the monitors 115, the AI module 125 and/or the preventive actions module 120 described previously. The process starts 1610 and obtains 1615 features and labels to train GNNs of present power grid. The trained model is used to build (or generate) 1620 an AI/ML model, for example, using a GNN model. The model may be trained and built by the AI module 125.

The characteristics of the AI/ML model may include a GNN model of the power grid 1015. The inputs (features) correspond to GNN node features and GNN edge features. The GNN nodes correspond to a power grid (PG) node (e.g., a junction) and the node features (or properties) include parameters, e.g., Voltage, Temp, EM-Stress, and Time, as shown in Table I. The GNN edges correspond to power grid (PG) branch/interconnects and the edge features (or properties) include parameters of Length, Width, Current density, Temp, EM-Stress, Time as shown in Table I. The outputs (labels) of the model include voltage at power grid (PG) nodes. For example, the input edge features may be a set {Length, Width, Current density, Temperature, EM-Stress, Time}, where all entities pertain to the interconnect segment. The input node features would be a set {Voltage, Temperature, EM-Stress, Time}. Current density will need to be calculated using the voltage and current sensor measurements followed by an IR drop analysis. The output node features would be {Future-Voltage}.

The process predicts 1625 future voltage at each power grid node using past, present, and future features along with the AI/ML model. The historical data of the labels are also used as input to the process. The process monitors 1630 future power grid node voltage versus a failure threshold, e.g., a predefined PG node voltage level. A notification is generated 1635 if a failure threshold is expected to be reached, e.g., met or exceeded (crossed). The process may optionally perform 1640 a remedial measure, in response to an expectation that a failure threshold is likely to be reached before ending 1645. In some embodiments, the remedial measures may be automatically executed.

Predicting whether failure may occur in any one or more of a logic block, e.g., 1005, a memory block, 1010, or a power grid, e.g., 1015, allows for preventing chip failure in advance. In some embodiments, it may be prudent to also track (or monitor) using a monitor the specific failure mechanisms. These monitors are similar to the monitors described in FIG. 2, e.g., 115, and are placed strategically across the chip. The monitors will track the health of the chip by tracking the effects of the fundamental failure mechanisms.

Example of Chip Failure Analysis Using Ageing Sensors

Figure 17:
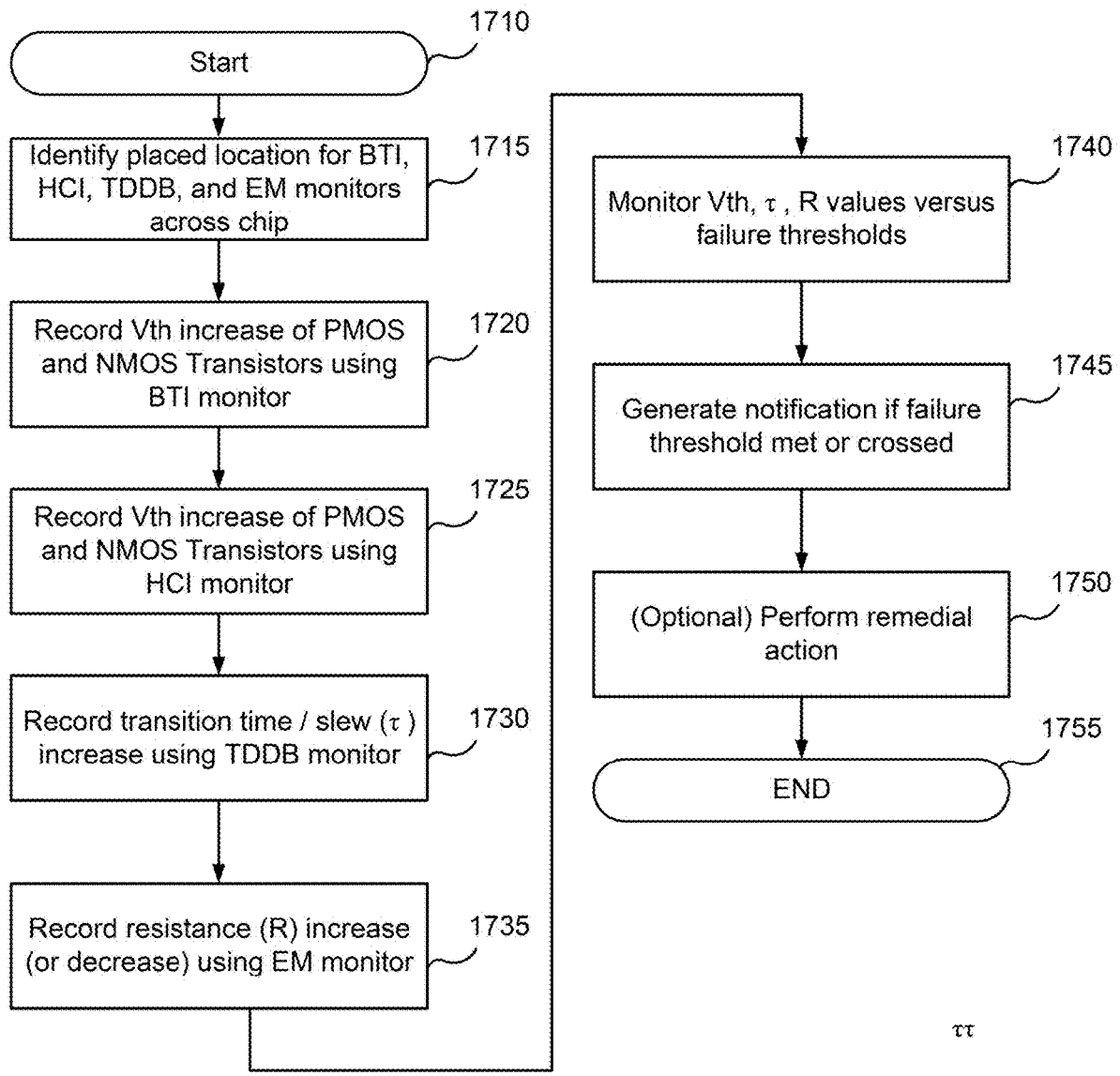
FIG. 17 illustrates a flowchart of an example process for chip failure prediction based on aging sensors within a chip in accordance with one embodiment.

FIG. 17 illustrates a flowchart of an example process for chip failure prediction based on aging sensors within a chip in accordance with one embodiment. Ageing sensors allow for monitoring overall chip health. The process starts 1710 and by identifying the placed BTI, HCl, TDDB and EM ageing monitors (including sensors), e.g., 115, across the chip 105. As an example, a conventional ring oscillator-based sensor can be used for BTI and HCl monitors. It basically translates the Vth increase into a delay to sense the Vth change. TDDB based sensor and an EM sensor can be built along the same lines.

The process records (e.g., receives and stores in the database 130) 1715 Vth increase of PMOS and NMOS transistors using the BTI monitor and records 1720 Vth increase of PMOS and NMOS transistors using the HCl monitor. The process records 1730 transition time/slew (t) increase using the TDDB monitor and records 1735 resistance (R) increase (or decrease) using the EM monitor. The process monitors 1740 Vth, t, and R values versus failure thresholds. A notification is generated 1745 if a failure threshold is reached, e.g., met or exceeded (crossed). The process may perform 1750 an optional remedial action before ending 1755. As with the other optional remedial actions, such actions may be, for example, an automated process to adjust chip operating characteristics or may be some other action such as shutting down a chip operation.

Example Computer System

Figure 18:
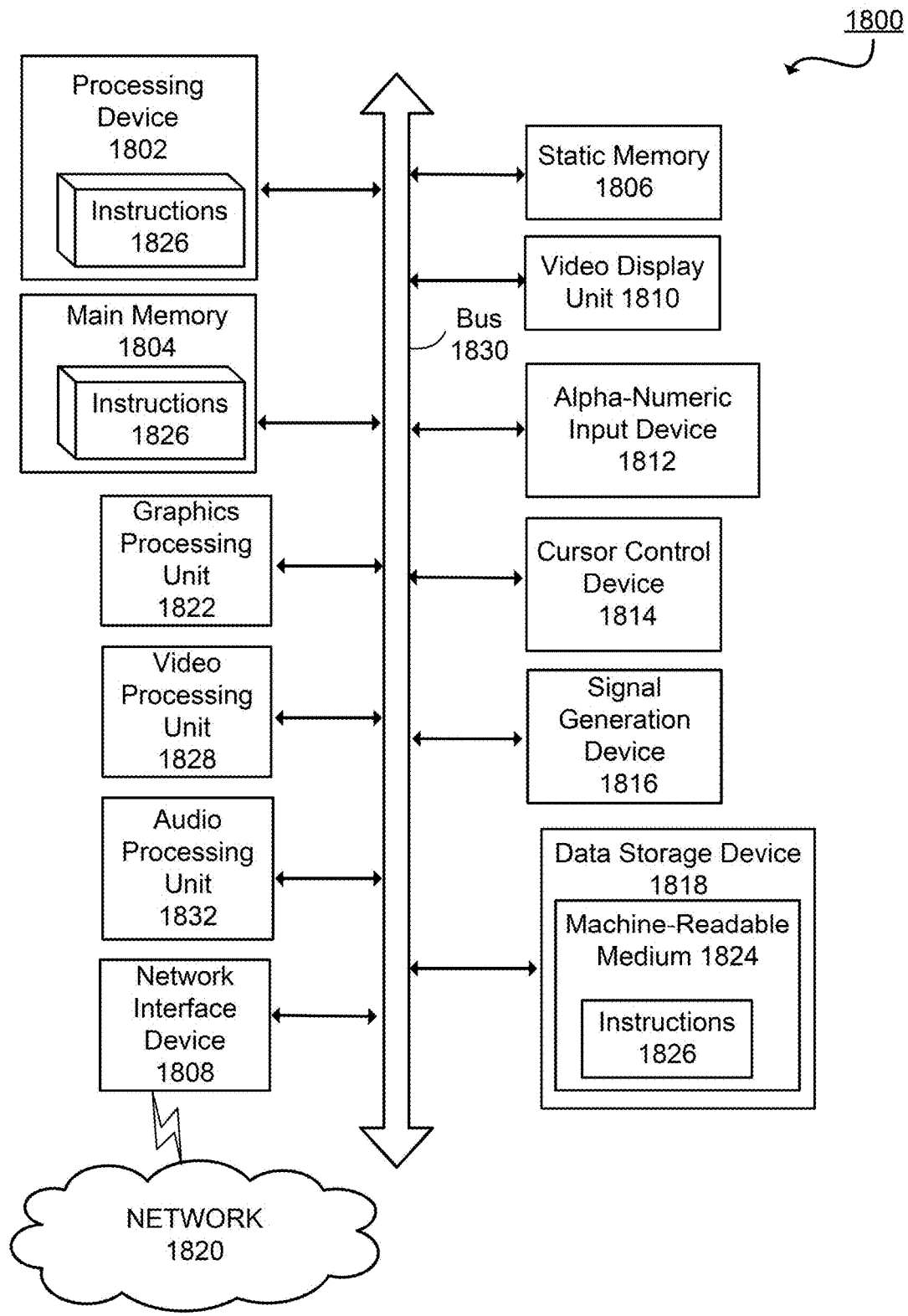
FIG. 18 illustrates an example machine of a computer system within which a set of instructions corresponding to the processes herein may be executed.

FIG. 18 illustrates an example machine of a computer system 1800 within which a set of instructions corresponding to the processes herein may be executed. For example, the computer system 1800 may be used to receive notification signals to execute the processing described herein including the AI and machine learning aspects as well as other functions such as generating (or providing for) a user interface for display. The machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1800 includes a processing device 1802, a main memory 1804 (e.g., read-only memory (ROM), flash memory, dynamic random access memory (DRAM) such as synchronous DRAM (SDRAM), a static memory 1806 (e.g., flash memory, static random access memory (SRAM), etc.), and a data storage device 1818, which communicate with each other via a bus 1830.

Processing device 1802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1802 may also be one or more special-purpose processing devices such as an application specific integrated circuit (ASIC), a field programmable gate array (FPGA), a digital signal processor (DSP), network processor, or the like. The processing device 1802 may be configured to execute instructions 1826 for performing the operations and steps described herein.

The computer system 1800 may further include a network interface device 1808 to communicate over the network 1820. The computer system 1800 also may include a video display unit 1810 (e.g., a liquid crystal display (LCD) or a cathode ray tube (CRT)), an alphanumeric input device 1812 (e.g., a keyboard), a cursor control device 1814 (e.g., a mouse), a graphics processing unit 1822, a signal generation device 1816 (e.g., a speaker), graphics processing unit 1822, video processing unit 1828, and audio processing unit 1832.

The data storage device 1818 may include a machine-readable storage medium 1824 (also known as a non-transitory computer-readable medium) on which is stored one or more sets of instructions 1826 or software embodying any one or more of the methodologies or functions described herein. The instructions 1826 may also reside, completely or at least partially, within the main memory 1804 and/or within the processing device 1802 during execution thereof by the computer system 1800, the main memory 1804 and the processing device 1802 also constituting machine-readable storage media.

In some implementations, the instructions 1826 include instructions to implement functionality corresponding to the present disclosure. While the machine-readable storage medium 1824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, PROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that various programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for predicting failure of an integrated circuit (IC) chip, the method comprising:
    identifying a logic block, comprised of one or more transistors and one or more interconnects, and a graph neural network (GNN) machine learning model to analyze the logic block;
    training the GNN machine learning model based on one or more features comprised of the one or more transistors and the one or more interconnects and one or more labels comprised of path delays based on a subcritical path and a critical path in the logic block, the GNN training model trained for predicting a path delay at a next time interval in the logic block by:
        triggering a timer to start and increment by a time, t, through a look back period;
        identifying for each increment of time, t, a feature of the one or more features that influences a label of the one or more labels;
        accumulating each identified feature and influenced label; and
        transmitting back the accumulated identified features and influenced labels to the GNN machine learning model to predict the path delay at the next time interval;
    determining whether the predicted path delay for the logic block will reach a failure threshold; and
    generating automatically a notification in response to the failure threshold being reached.

2. The method of claim 1, further comprising triggering a remedial action in response to the failure threshold being reached.

3. The method of claim 1, wherein the one or more transistor further comprises transistor parameters.

4. The method of claim 3, wherein the one or more interconnects further comprises interconnect parameters.

5. The method of claim 1, wherein predicting the path delay further comprises:
    generating for each gate belonging to a critical path and sub critical path, a prediction of a gate delay; and
    summing the generated prediction of the gate delay from each gate to estimate sub-critical and critical path delay.

6. The method of claim 5, wherein the summing further comprises:
    estimating subcritical path delays;
    identifying a basic gate delay summation delay;
    finding a $\beta$ where $\beta$ is a ratio of the estimated critical path delay and the basic gate delay summation delay; and
    multiplying the basic gate delay summation delay of a critical path or a sub-critical path by $\beta$ of a similar sub-critical path.

7. The method of claim 1, wherein the logic block comprises a memory block, the one or more features comprises circuit transistor parameters and interconnect parameters and one or more labels comprises static noise margin, write margin, and read margin, and a minimum retention voltage.

8. A method for predicting failure in an integrated circuit (IC) chip, the method comprising:
    identifying a circuit component, comprised of one or more transistors and one or more interconnects and time model machine learning model to analyze the circuit component;
    training a time-based machine learning model based on one or more features comprised of the one or more circuit transistors and the one or more interconnects and one or more labels comprised of path delays based on at least one of a critical path and a subcritical path, the time model training model trained for predicting a path delay at a next time interval in the circuit component by:
        triggering a timer to start and increment by a time, t, through a look back period;
        identifying for each increment of time, t, in the look back period a feature of the one or more features that influences a label of the one or more labels;
        accumulating each identified feature and influenced label in a dataset; and
        transmitting to the time based machine learning model the dataset of the accumulated identified features and influenced labels to predict the path delay at the next time interval;
    determining, using the time based machine learning model, whether the predicted path delay for the circuit component will reach a failure threshold; and
    generating automatically a notification in response to a determination that the failure threshold is being reached.

9. The method of claim 8, wherein the one or more circuit transistors further comprises transistor parameters and the one or more interconnects further comprises interconnect parameters.

10. The method of claim 8, wherein predicting the path delay further comprises:
    generating for each gate belonging to a critical path and sub critical path, a prediction of a gate delay; and
    summing the generated prediction of the gate delay from each gate to estimate sub-critical and critical path delay.

11. The method of claim 10, further wherein the summing further comprises:
    estimating subcritical path delays;
    identifying a basic gate delay summation delay;
    finding a $\beta$ where $\beta$ is a ratio of the estimated critical path delay and the basic gate delay summation delay; and
    multiplying the basic gate delay summation delay of a critical path or a sub-critical path by $\beta$ of a similar sub-critical path.

12. The method of claim 9, wherein the circuit component is one of a logic block and a memory block.

13. The method of claim 9, further executing a remedial action in response to the failure threshold being reached.

14. The method of claim 9, wherein the time-based machine learning model is one of auto-regressive moving average (ARIMA)), a multi-layer perceptron (MLP), and a recurrent neural network (long short term memory (LSTM)).

15. A non-transitory computer readable storage medium comprising stored instructions executable by one or more processors and comprising instructions to predict failure in an integrated circuit (IC) chip, the instructions when executed cause the processor to:
    identify a circuit component, comprised of one or more transistors and one or more interconnects and time model machine learning model to analyze the circuit component;
    train a time-based machine learning model based on one or more features comprised of the one or more circuit transistors and the one or more interconnects and one or more labels comprised of path delays based on at least one of a critical path and a subcritical path, the time model training model trained to predict a path delay at a next time interval in the circuit component through instructions to:
        trigger a timer to start and increment by a time, t, through a look back period;

identify for each increment of time, t, in the look back period a feature of the one or more features that influences a label of the one or more labels;

accumulate each identified feature and influenced label in a dataset; and transmit to the time based machine learning model the dataset of the accumulated identified features and influenced labels to predict the path delay at the next time interval;

determine, through the time based machine learning model, whether the predicted path delay for the circuit component will reach a failure threshold; and generate a notification in response to a determination that the failure threshold is being reached.

16. The non-transitory computer readable storage medium of claim 15, wherein the one or more circuit transistors further comprises transistor parameters and the one or more interconnects further comprises interconnect parameters.

17. The non-transitory computer readable storage medium of claim 16, wherein the instructions to predict the path delay further comprises instructions that when executed causes the one or more processors to:

generate for each gate belonging to a critical path and sub critical path, a prediction of a gate delay; and sum the generated prediction of the gate delay from each gate to estimate sub-critical and critical path delay.

18. The non-transitory computer readable storage medium of claim 17, further wherein the instructions to sum further comprises instructions that when executed causes the one or more processors to:

estimate subcritical path delays;

identify a basic gate delay summation delay;

identify a β where β is a ratio of the estimated critical path delay and the basic gate delay summation; and multiply the basic gate delay summation delay of a critical path or a sub-critical path by β of a similar sub-critical path.

19. The non-transitory computer readable storage medium of claim 16, wherein the circuit component is one of a logic block and a memory block.

20. The non-transitory computer readable storage medium of claim 16, further comprising instructions to execute a remedial action in response to the failure threshold being reached.

21. The non-transitory computer readable storage medium of claim 16, wherein the time-based machine learning model is one of auto-regressive moving average (ARIMA)), a multi-layer perceptron (MLP), and a recurrent neural network (long short term memory (LSTM)).

* * * * *